United States Patent
Kraus et al.

(10) Patent No.: US 9,632,906 B2
(45) Date of Patent: Apr. 25, 2017

(54) AUTOMATED SOFTWARE SYSTEM VALIDITY TESTING

(71) Applicant: CA, Inc., Islandia, NY (US)

(72) Inventors: Christopher C. Kraus, Dallas, TX (US); John J. Michelsen, Arlington, TX (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 13/840,697

(22) Filed: Mar. 15, 2013

(65) Prior Publication Data

US 2015/0212920 A1    Jul. 30, 2015

(51) Int. Cl.
*G06F 11/36* (2006.01)
*G06F 11/34* (2006.01)
*G06F 11/30* (2006.01)

(52) U.S. Cl.
CPC ...... *G06F 11/3466* (2013.01); *G06F 11/3006* (2013.01); *G06F 11/3093* (2013.01); *G06F 11/36* (2013.01); *G06F 11/3409* (2013.01); *G06F 2201/815* (2013.01); *G06F 2201/865* (2013.01); *G06F 2201/87* (2013.01); *G06F 2201/875* (2013.01)

(58) Field of Classification Search
CPC ............ G06F 11/3684; G06F 11/3664; G06F 11/3668
USPC ......................................................... 717/127
See application file for complete search history.

(56) References Cited

U.S. PATENT DOCUMENTS

| | | |
|---|---|---|
| 8,112,262 B1 | 2/2012 | Michelsen |
| 2002/0100018 A1* | 7/2002 | Click, Jr. ............ G06F 11/3628 717/124 |
| 2003/0163608 A1 | 8/2003 | Tiwary et al. |
| 2004/0039728 A1* | 2/2004 | Fenlon et al. .................... 707/1 |
| 2005/0010661 A1 | 1/2005 | Southam et al. |
| 2006/0184829 A1 | 8/2006 | Cheong et al. |
| 2015/0205699 A1 | 7/2015 | Michelsen |
| 2015/0205700 A1 | 7/2015 | Michelsen |
| 2015/0205701 A1 | 7/2015 | Michelsen |
| 2015/0205702 A1 | 7/2015 | Michelsen |
| 2015/0205703 A1 | 7/2015 | Michelsen |
| 2015/0205708 A1 | 7/2015 | Michelsen |
| 2015/0205712 A1 | 7/2015 | Michelsen |
| 2015/0205713 A1 | 7/2015 | Michelsen |
| 2015/0220423 A1 | 8/2015 | Kraus et al. |

OTHER PUBLICATIONS

Interactive TKO, LISA User's Guide Version 2.0, Feb. 27, 2003, p. 9, 24, 29, 30, 37, 79, 91, 92, 93.*
Rob Hailstone, LISA Suite-v5.0, Interactive TKO (iTKO), Jun. 2010, OVUM, p. 7.*

(Continued)

*Primary Examiner* — Li B Zhen
*Assistant Examiner* — Daniel Wei
(74) *Attorney, Agent, or Firm* — Patent Capital Group

(57) ABSTRACT

Data is identified that represents a path of a transaction that includes a plurality of transaction fragments associated with a plurality of software components. The transaction returns a particular value and a particular one of the plurality of software components is identified as a source of the particular value. A test action is generated that, when executed, is to attempt to verify the particular value from the particular software component.

17 Claims, 16 Drawing Sheets

(56) References Cited

OTHER PUBLICATIONS

U.S. Appl. No. 13/840,979, filed Mar. 15, 2013 entitled Transactional Boundaries for Virtual Model Generation, inventors Christopher C. Kraus et al.
Non-Final Office Action in U.S. Appl. No. 13/840,979 mailed on Jan. 28, 2015.
Response to Non-Final Office Action in U.S. Appl. No. 13/840,979, filed Apr. 28, 2015.
Final Office Action in U.S. Appl. No. 13/840,979 mailed on May 22, 2015.
Request for Continued Examination and Amendment in U.S. Appl. No. 13/840,979, filed Aug. 24, 2015.
Non-Final Office Action in U.S. Appl. No. 13/840,979 mailed on Oct. 5, 2015.
Response to Non-Final Office Action dated Oct. 5, 2015 in U.S. Appl. No. 13/840,979, filed Jan. 5, 2016.

* cited by examiner

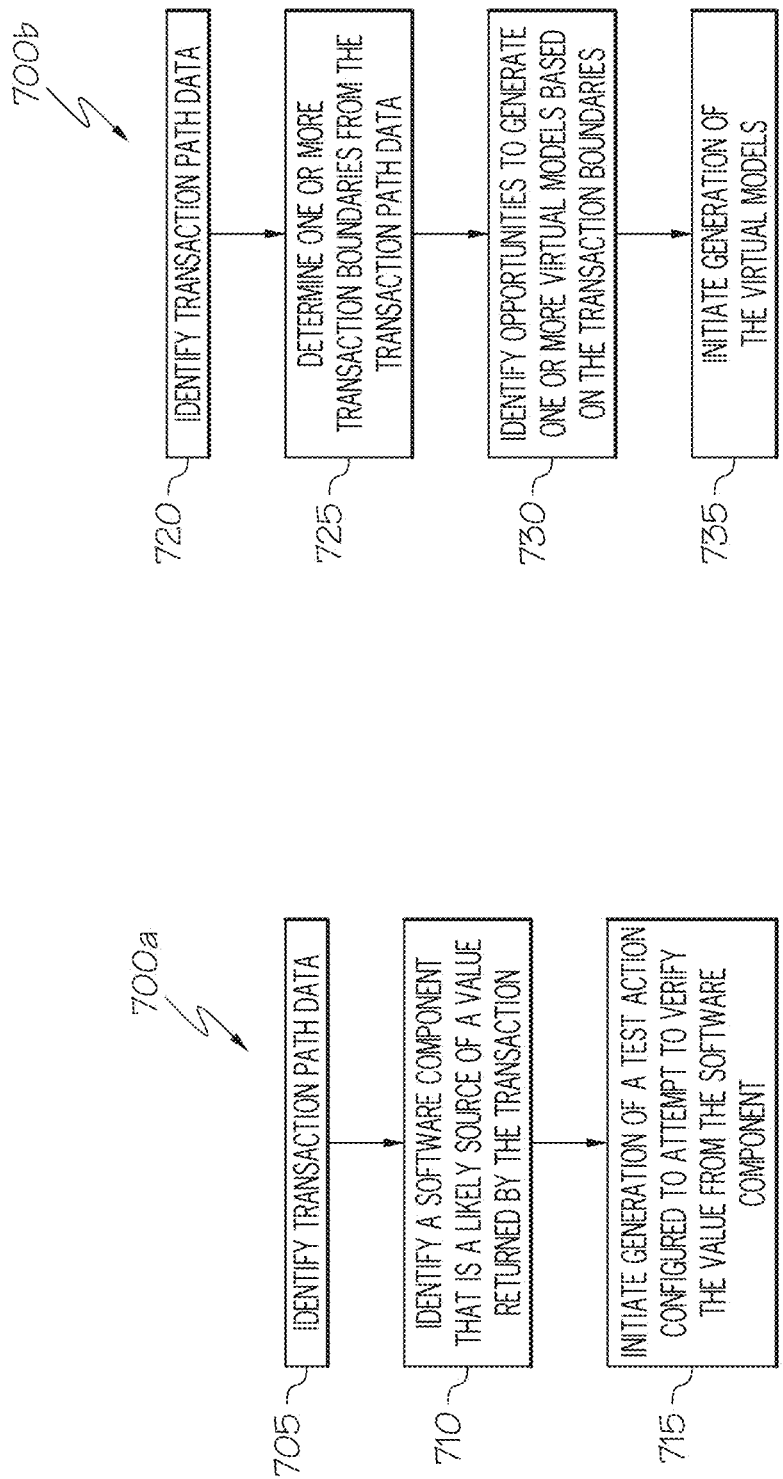

AUTOMATED SOFTWARE SYSTEM VALIDITY TESTING

BACKGROUND

The present disclosure relates in general to the field of computer testing, and more specifically, to generating computer software tests.

Deployments of composite applications and systems are increasing. Composite applications and systems can include multiple different software components working in combination to deliver particular results or services. In some composite systems and applications, software components from a variety of different sources and developers can be combined and cooperatively function. While efficiencies and advantages have been realized in the development of software by employing composite components, testing of such systems can be complicated.

Test stubs have been developed to test operability of software systems for certain pre-defined scenarios. A wide variety of tests are utilized in connection with the development and maintenance of software systems. For instance, regression testing can be used to uncover new software bugs, or regressions, in components of a system. In another example, load testing can be used to test the response of a system to various load conditions, such as peak or spiking load conditions.

BRIEF SUMMARY

According to one aspect of the present disclosure, data can be identified that represents a path of a transaction that includes a plurality of transaction fragments associated with a plurality of software components. The transaction can return a particular value and a particular one of the plurality of software components can be identified as a source of the particular value. A test action can be generated that is adapted, when executed, to attempt to verify the particular value from the particular software component.

According to a further aspect of the present disclosure, data can be identified that represents a path of a transaction that includes a plurality of transaction fragments associated with a plurality of software components. The plurality of software components can include a first software component to communicate in the transaction with a second software component over an interface. A transaction boundary can be determined between the first and second software components based at least in part on the data. A virtual model can be generated automatically to simulate at least a particular one of the plurality of software components based on the identified transaction boundary.

BRIEF DESCRIPTION OF THE DRAWINGS

FIGS. 7A-7B are simplified flowcharts illustrating example techniques in connection with tests of a software system in accordance with at least one embodiment.

Like reference numbers and designations in the various drawings indicate like elements.

DETAILED DESCRIPTION

Figure 1:
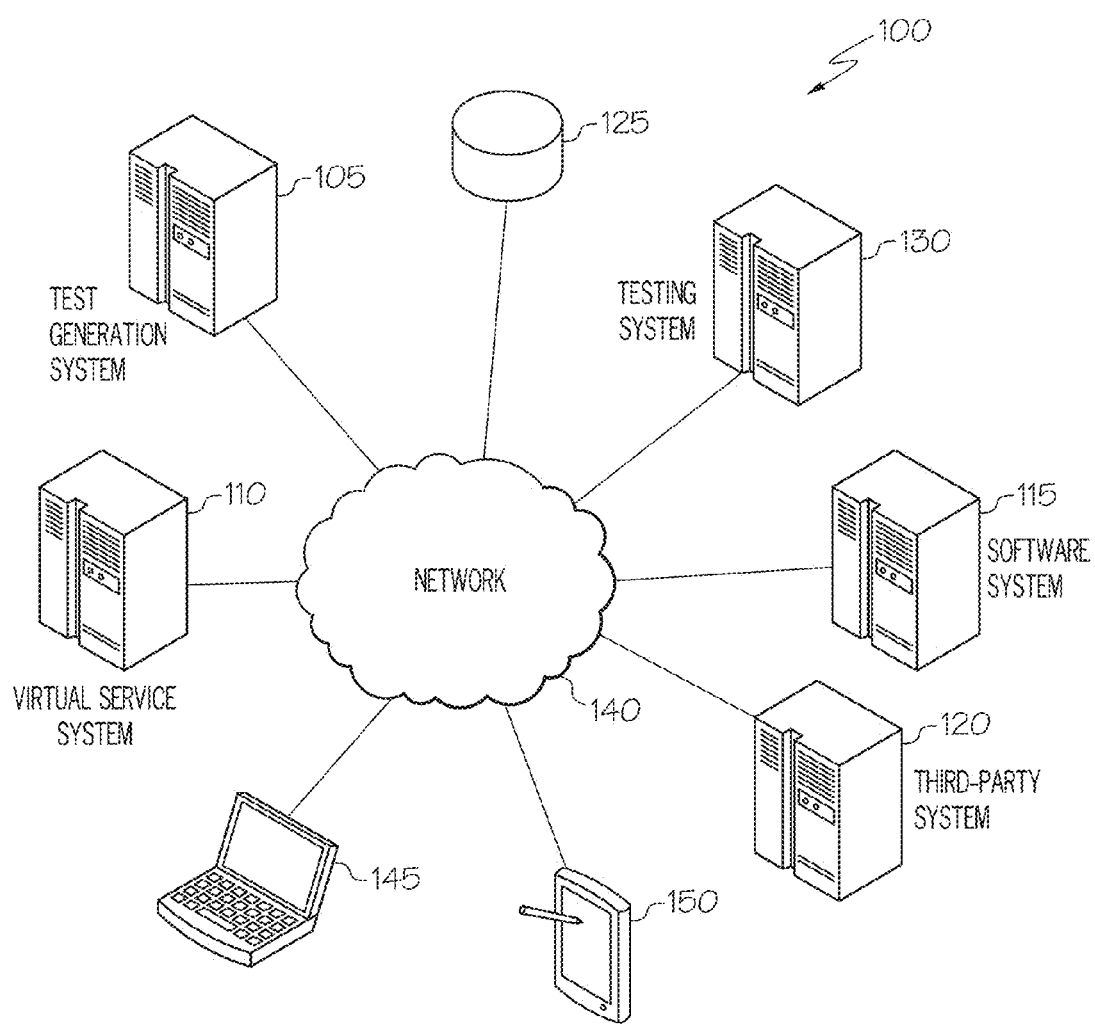
FIG. 1 is a simplified schematic diagram of an example computing system including an example test generation system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a simplified block diagram illustrating an example computing system 100 including a test generation system 105, virtual service system 110, testing system 130, among other hardware and software computing systems. In some implementations, functionality of the test generation system 105, virtual service system 110, testing system 130, can be combined or even further divided and implemented among multiple different systems. Test generation system 105 can include logic and functionality for developing and generating test checks and other testing logic, as well as virtual models simulating various aspects of a software system (e.g., 115) for use in tests of the software system.

In some instances, software systems (e.g., 115) can utilize, consume data and services of, provide data or services to, or otherwise be at least partially dependent on or function in association with one or more other computing systems, including third party computing systems (e.g., 120), or data stores, such as database 125, among other examples. Further, virtual models can be generated that simulate the actions of other systems and software components with which a system under test (e.g., 115) interacts. For instance, a test can be developed for execution by testing system 130 that can make use of virtualized instances (or models) of a third party system (e.g., 120), database (e.g., 125), or other systems and system components, including local system components, that simulate interactions and dependencies of the virtualized components with the system under test, among other examples.

One or more computing systems and services can be hosted on machines communicatively coupled by one or more networks (e.g., 140), including local networks, public networks, wide area networks, broadband cellular networks, the Internet, and the like. Systems with which a system (e.g., 115) under test, development, used in training, etc. can interact can include other data stores (e.g., 125), systems (e.g., 120), and constituent software components accessible over the one or more networks 140. Further, systems and services (e.g., 105, 110, 130, etc.) provided to test and simulate one or more of systems 115, 120, 125, etc. can also be provided local to or remote from (e.g., over network 140) the target systems, among other examples. Additionally, computing environment 100 can include one or more user devices (e.g., 145, 150) that can allow users to interact with one or more of the servers, services, data structures, and services (e.g., 105, 110, 115, 120, 125, 130, etc.) provided, for instance, remotely over network 140, or at least partially local to the user devices (e.g., 145, 150), among other examples.

In general, "servers," "clients," "computing devices," "network elements," "hosts," "system-type system entities," "user devices," and "systems" (e.g., 105, 120, 125, 130, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 120, 125, 130, 145, 150, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a test generation system 105, virtual service system 110, system under test (e.g., 115) or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, sub-system, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

In traditional software testing, it can be difficult to determine how each of several different components of a software system affect an output or the overall performance of the system. Further, it can be difficult to pinpoint which of the various components is responsible for a given value or action. Consequently, among other challenges, traditional software testing systems may ignore values that are not conveniently verifiable from comparisons of or correlations between the input values (or "request values") entered into or otherwise used by the system and the eventual outputs (or "response values") of the system. For instance, dynamic response values, such as response values that change over time or that are otherwise at least partially independent of the input values entered into the software system under test, may be difficult to predict and thereby difficult to test to conclude whether the resulting dynamic value is correct. Consequently, it can be difficult to determine whether a system under test is functioning completely as expected when at least some values are not capable of being verified by the testing system.

Further, traditional testing can be further complicated by the interdependence of modern software systems. A given service, application, or other software system may interact with and consume data and services from one or more outside services, applications, databases, etc., including third party systems accessed over one or more networks. In one example, a software developer may be unable to test and determine whether a new application is responding too slowly due to performance problems within the application itself, network congestion affecting the application's interactions with a web server from which the application obtains data, or a sluggish database that the web server interacts with, among other examples. Since each of these components may be implemented independently or by different parties, it can be difficult to gain access to and test all of the components in a manner that captures the interactions between the components. Furthermore, since some of the components (such as third party software components) may be outside of the control of the tester or otherwise not allow modification of their code or monitoring for testing purposes, this difficulty may be exacerbated. Additionally, while some tools are available to assist in simulating the actions of other systems interacting with a system under test, traditionally, building and designing such tools is a manual activity, forcing a user to first determine the often complex interactions between various software components and then determine how and to what extent virtual models and other testing tools can be deployed for the various software components, among other examples, challenges, and shortcomings.

Figure 2:
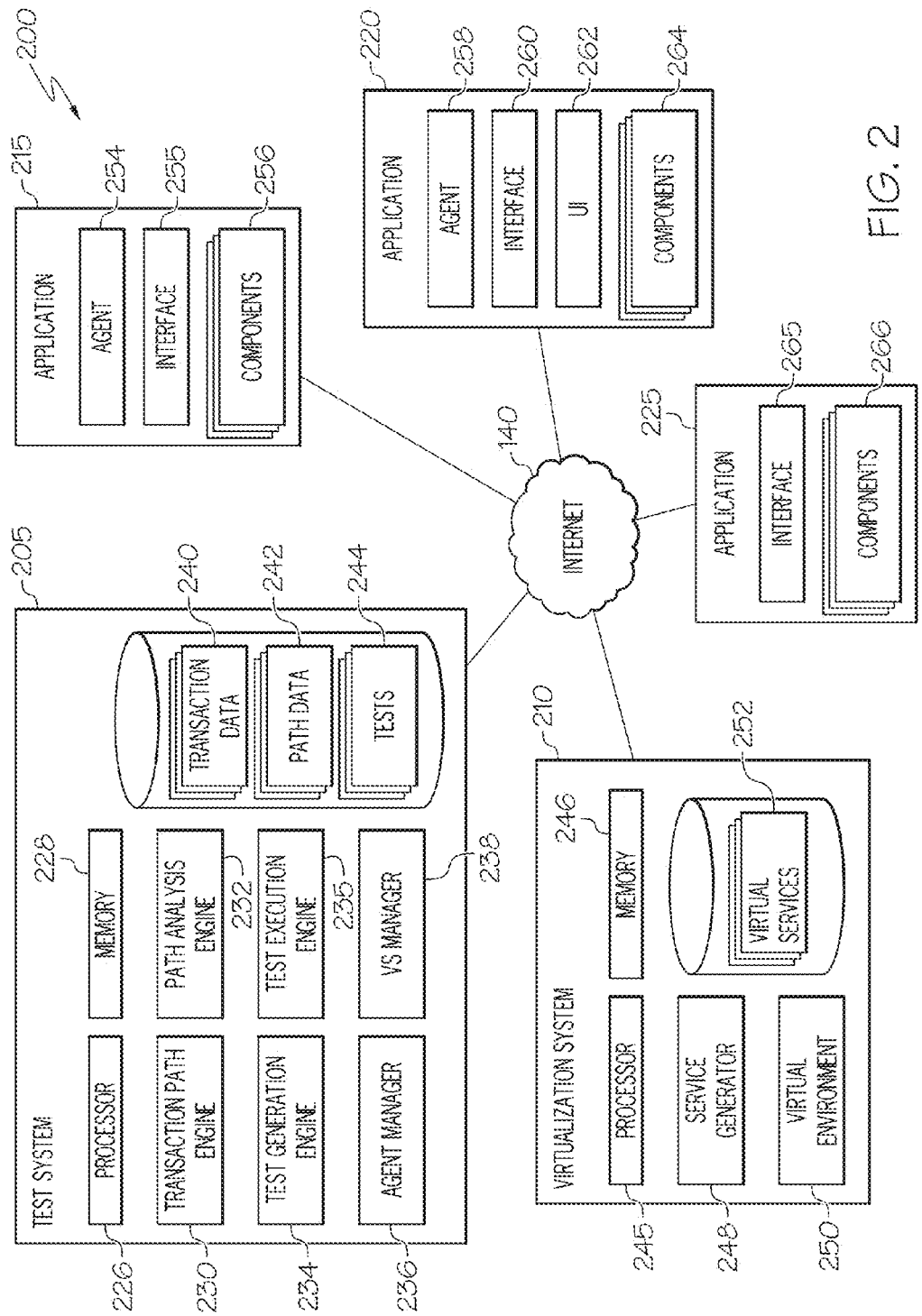
FIG. 2 is a simplified block diagram of an example computing system including an example test system and virtualization system in accordance with at least one embodiment.

At least some of the systems described in the present disclosure, such as the systems of FIGS. 1 and 2, can include functionality that, in some cases, at least partially remedy or otherwise address at least some of the above-discussed deficiencies and issues, as well as others not explicitly described herein. For instance, tools can be provided that permit the identification of the software components involved in a transaction of one or more software systems as well as the flow of data and operations within the transaction. Information from such flows can be used, for instance, to identify the particular software components, databases, and third party systems that serve as the source for various portions of the output for the transactions. Test actions, such as test checks, can then be generated and executed for the source components to verify each of the values returned or generated in connection with a given transaction to be analyzed in connection with the testing of the software system. Further, transaction flow information can be further used to identify boundaries between various software components and automatically identify opportunities to virtualize or simulate software components in connection with one or more tests, among other examples and potential benefits.

Turning to the example of FIG. 2, a simplified block diagram 200 is shown illustrating an example environment 200 including a test system 205, a virtualization system 210, and one or more services, database management systems, programs, or applications (referred to in this example collectively as "applications"). The systems 205, 210, 215, 220, 225, etc. can interact, for instance, over one or more networks 140. In one example implementation, a test system 205 can include one or more processor devices (e.g., 226) and one or more memory elements (e.g., 228) for use in executing one or more components, tools, or modules, or engines, such as a transaction path engine 230, path analysis engine 232, test generation engine 234, test execution engine 235, agent manager 236, virtual service manager 238, among other potential tools and components including combinations or further compartmentalization of the foregoing. In some implementations, test system 205 can be implemented as multiple different systems including, for example, varying combinations of the foregoing components and tools (e.g., 230, 232, 234, 235, 236, 238, etc.) and accompanying data (e.g., 240, 242, 244).

In one example, test system 205 can include a transaction path engine 230 configured to inspect a particular application (e.g., 215, 20, 225) or combination of co-functioning applications (e.g., 215 and 220) to identify one or more transactions involving the application(s) as well as the respective software components (e.g., 256, 264, 266) of the applications (e.g., 215, 220, 225) invoked and utilized within the transaction. Information gathered from monitoring or inspection of the transaction can be stored in transaction data 240. Further, the flow path of the transactions can additionally be identified and flow path data 242 can be generated describing the flow between software components (e.g., 256, 264, 266) and the respective contributions, operations, processes, or transaction fragments of the applications within the flow.

In some implementations, transaction path engine 230 can operate cooperatively with an agent manager 236 interfacing with or otherwise managing one or more instrumentation agents (or "agents") (e.g., 254, 258) deployed on one or more applications (e.g., 215, 220) for use in aiding the monitoring of performance of various components (e.g., 256, 264) of the applications. Agents (e.g., 254, 258) can be software-implemented agents that are configured to provide visibility into the operations of each instrumented component (e.g., 256, 264, etc.). Each agent can be configured, for example, to detect requests and responses being sent to and from the component or application in which that agent is embedded. Each agent (e.g., 254, 258) can be configured to generate information about the detected requests and/or responses and to report that information to other services and tools, such as agent manager 236, virtualization system 210, transaction path engine 230, test execution engine 235, etc. Such information can be embodied as agent data. Additionally, each agent can be configured to detect and report on activity that occurs internal to the component in which the instrumentation agent is embedded. Agents can be implemented in a variety of ways, including instrumenting each component with a corresponding agent, instrumenting an application or other collection of the software components with a single, shared agent, among other examples.

In response to detecting a request, response, and/or other activity to be monitored, each agent (e.g., 254, 258) can be configured to detect one or more characteristics associated with that activity and/or the monitoring of that activity by the agent. The characteristics can include a frame identifier, which identifies a message, with respect to the agent, sent by the instrumentation agent to a managing service, such as agent manager 236 to report the characteristics observed by the agent. For instance, frames can include a parent identifier, which identifies the requester that generated the request sent to the component or sub-component monitored by the instrumentation agent; a transaction identifier, identifying the transaction, with respect to the component or sub-component being monitored, such as transactions between components carried out through communications and calls made over one or more network connections; and an agent identifier that identifies the agent, with respect to the other instrumentation agents in the testing system, that is generating the characteristics, among other characteristics. Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, method invocations (such as Enterprise Java Beans (EJB) method invocations), entity lifecycle events (such as EJB entity lifecycle events), heap sizing, identification of network connections involved in transactions, identification of messages and data exchanged between components, including the amount of such data, and the like. Characteristics can also include the thread name of a thread processing the request to generate the response and other data describing threads involved in a transaction, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, and the like, among other examples.

As the above examples indicate, characteristic information can include information generated by the agent itself and information generated and/or processed by the component or sub-component monitored (and collected) by the agent. The agent can then cause information identifying those characteristics to be provided to one or more other services or tools (e.g., 230, 236 etc.) communicatively coupled to the agent. In some embodiments, each instrumentation agent collects information to form a message, also referred to herein as a frame, which describes characteristics associated with both a detected request and a detected response corresponding to that request. In such embodiments, the respective agent can wait for the response corresponding to the request to be generated and sent before sending the frame to another tool or engine (e.g., 230, 232, 234, 235, 236, 248, etc.) making use of the information in the frame. Additionally, agents can monitor and report characteristics independently for each transaction in which its respective monitored component(s) (e.g., 256, 264, etc.) participates. In addition to monitoring the performance of a component and aggregating information about that component over one or a multitude of transactions (such that information about the performance of individual transactions can, for example, be averaged or statistically assessed based upon the observed performance of the component over the course of multiple monitored transactions), agents (e.g., 254, 258) can additionally provide characteristics that are specific to and correlated with a specific transaction. More particularly, these characteristics that are monitored and reported by the agents can be specific to and correlated with a particular request and/or response generated as a part, or fragment, of a transaction.

In some embodiments, all or some of agents (e.g., 254, 258) can be configured to perform interception and/or inspection (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the agent to detect requests and responses, as well as the characteristics of those responses. In particular, this functionality can allow an agent to detect when a component begins reading and/or writing from and/or to a socket, to track how much data is accessed (e.g., read or written), obtain a copy of the data so read or written, and generate timing information (as well as information describing any other desired characteristics such as inbound/read or outbound/write identifiers) describing the time or order at which the data was read or written.

In some instances, agents (e.g., 254, 258) can be configured to monitor individual threads by monitoring the storage used by each thread (i.e., the thread local storage for that thread), among other information. Such agents can detect when the monitored thread begins reading or writing to a thread local variable in the thread local storage. In response to detecting this access to the thread local variable, the agent can track the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, network calls being made, and the like.

As noted above, in some implementations, one of the characteristics that can be collected by agents (e.g., 254, 258) can include timing information, such as a timestamp, that indicates when a particular request was received or when a particular response was generated. Such timing information can be included in transaction data 240 and be used, for instance, by transaction path engine 230, to identify that frames, including frames received from different agents, are related to the same transaction. In some implementations, timers used by agents (e.g., 254, 258) can be synchronized to assist in correlating timing information collected between multiple agents. Additionally or alternatively, flow, organization, hierarchy, or timing of a particular transaction can be identified through the generation of transaction identifiers that include characteristics collected by agents (e.g., 254, 258) for use in identifying fragments of the transaction. Such transaction identifiers, or transaction fragment identifiers, can include data collected by instrumentation agents in connection with, for example, the exchange of data, messaging, and other communications between components in the transaction, from thread jumps identified within software processes involved in the transaction, and other features of the transaction or fragments of the transaction.

In some implementations, agents (e.g., 254, 258) can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an agent configured to monitor an EJB can be configured as an EJB3 entity listener (e.g., to monitor entity beans) or interceptor (e.g., to monitor session beans). Some components (or their corresponding application servers) may not provide users with the ability to modify their code, and thus some instrumentation agents can be implemented externally to the component being monitored in a manner that can cause all requests and responses being sent to and/or from that component to be handled by the corresponding agent(s). For example, for an existing database, an agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the "real" driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses within corresponding transaction data 240, among other examples.

As requests and responses progress through one or more systems (e.g., 215, 220, 225), additional characteristic information can be captured, for instance, as transaction data 240. For example, a test, simulation, or live operation of one or more software systems (e.g., 215, 220, 225) engaged in one or more transactions can be monitored, for instance, by one or more agents (e.g., 254, 258) and the agents can capture characteristic information associated with requests in the transaction (e.g., the time at which the request was received, the sender of that request, the time at which corresponding requests were sent to a database and/or other service, etc., how much data was exchanged, the identity of the communication channel used in the request or response, and the like) and the corresponding response, and generate transaction data 240 embodying the information. Agents in some instances can store at least a portion of the transaction data at the agent and can also, or alternatively, send transaction data 240 to other services and tools. In some instances, transaction data can be generated from or comprise agent data, among other examples.

In one implementation, a transaction path engine 230 can access and utilize transaction information in transaction data 240 to identify fragments of a transaction and organize transaction fragments and accompanying information describing characteristics of the fragment of a particular transaction into groups corresponding to a common transaction. For instance, transaction fragment characteristics can be correlated to group corresponding frames into groups of frames that describe a complete transaction. In some embodiments, in order to group frames, or otherwise identify relationships between frames or transaction fragments, transaction path engine 230 (or another tool) can sort the frames based upon particular characteristics, such as timing information associated with and/or included within those frames. After being sorted, the frames can be arranged in ascending or descending order, with respect to the timing information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information. In other examples, frames can be sorted, for example, based on an amount of data exchanged, the identity of a particular communication channel or network connection used, the identification of the particular agents that provided the frames, etc.

After sorting the frames, transaction path engine 230 can then group the frames into transactions based on the identified relationships between the detected transaction fragments. In some implementations, frames and accompanying transaction fragments can be correlated according to the amount and type of data that was received and/or generated, as detected by the agent, as well as information identifying the components or sub-components involved in the monitored activity. For example, such identity information can include information identifying the network ports (e.g., of the requester and responder), IP addresses, network information, or other features describing the communication of a request and corresponding response between a requester and responder. This information can be used to correlate or otherwise identify relationships between two different frames that have similar timing information and data amounts, for example. Identified network connections can be mapped to a particular portion, or fragment, of a transaction, and such fragments can be grouped (e.g., using the collected network connection description data) to identify particular transactions involving multiple different software components (and network connections), among other examples.

Within a group of frames or identified transaction fragments associated with the same transaction, transaction path engine 230 can order the frames, such that the flow of the transaction can be followed from the start of the transaction to the end of the transaction. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated by the agents. In one embodiment, the frame identifiers can be generated from information identifying the IP address (or other addressing information) and port number used by the monitored component or sub-component, the amount of data sent or received by the monitored component during the monitored activity, and/or the instrumentation agent itself, among other information. Relationships can thereby be identified between parent frames, transaction fragments, and software components and corresponding child frames, transaction fragments, and components, among other examples.

In addition to being able to use relationships or correlations to predict or determine a stitching or flowpath of transaction fragments, transaction path engine 230, in some instances can use the lack of correlative data reported by an agent to determine a root or leaf (e.g., beginning or end) of a particular transaction or branch of a transaction. For instance, it can be identified that no related connections (or other transaction fragments) involving a particular software component have been identified or reported and conclude, predictively, that the lack of further connections or other reporting data relating to the component or a flow including the component indicates that the transaction terminated at the component, among other examples. Similarly, root nodes can be predictively determined based on the absence of frames documenting an inbound connection at a particular component from which other transaction fragments (and related connections) originate, among other examples.

A transaction path engine 230 can utilize and correlate transaction data 240 (or agent data upon which transaction data is based) generated in part by one or more agents (e.g., 254, 258) to determine one or more transaction flow paths. The transaction path engine 230 can generate and maintain path data 242 describing the determined flow paths involving one or more software components (e.g., 256, 264, 266) or one or more software systems or applications (e.g., 215, 220, 225). A path analysis engine 232 can consume path data 242 to perform additional activities and services in support of tests of software systems (e.g., 215, 220, 225). For instance, a path analysis engine can identify boundaries between systems (e.g., 215, 220, 225) and/or components (e.g., 256, 264, 266) and identify opportunities to generate one or more test cases or virtual models of one or more of the systems (e.g., 215, 220, 225) and/or software components (e.g., 256, 264, 266). Additionally, path analysis engine 232 can identify particular data (e.g., as captured in transaction data or other agent data) that is generated within transactions modeled by the path data 242 and further identify sources of the particular data as well as the path of the particular data as it traverses and is processed by other software components within a transaction before being output as a response or result of the transaction, among other examples. Path analysis engine 232 can further, in some instances, process transaction path data or other data to identify boundaries between system components and systems within a system, as well as boundaries of portions of systems monitored by a respective agent, among other examples.

Indeed, in some implementations, test generation engine 234 can utilize intelligence gleaned from path analysis engine 232 to develop, improve, and generate test actions, including test checks, to be run against one or more of the software components or systems involved in a transaction to be tested. Transaction data or agent data can be further used by other components, such as a virtual service manager 238 configured to manage the generation and use of virtual services and models used in various tests. For instance, a test execution engine 235 can execute tests 244 generated or defined, for instance, by test generation engine 234. In some instances, tests 244 can leverage structural information describing the flow and contributions of various software components within a transaction to perform test activities that verify correct operation of the software components and progression of a data value within a transaction.

In still other examples, a virtualization system 210 can be provided that includes one or more processor devices 245, memory devices 246, and other hardware and software components including, for instance, a virtual service generator 248, virtual environment 250 for provisioning and executing virtual services, among other examples. A virtualization system 210 can be used to generate and manage virtual services (e.g., 252) that model software components and systems. Such virtual services 252 can be used as stand-ins in tests involving the real-world systems modeled by the virtual service. Virtual services 252 can be generated by virtualization system 210 (e.g., using virtual service generator 248) based on detected requests and responses exchanged between two or more software components or systems. Such request and response information can be captured, for instance, by agents (e.g., 254, 258) capable of monitoring a software component that is to be virtualized or that interacts with another software component to be virtualized, among other examples. Virtual services can capture and simulate the behavior, data and performance characteristics of complete composite application environments, making them available for development and testing at the request of a user or system and throughout the software lifecycle, among other advantages.

A virtualization system 210 can include functionality for the creation of complete software-based environments that simulate observed behaviors, stateful transactions and performance scenarios implemented by one or more software components or applications. Such virtual services provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment 250 implemented, for instance, within on-premise computing environments, in private and public cloud-based lab, using virtual machines, traditional operating systems, and other environments, among other examples. In some implementations, virtualization system 210 and virtual services 252 can utilize or adopt principles described, for example, in U.S. patent application Ser. No. 13/341,650 entitled "Service Modeling and Virtualization," incorporated herein by reference in its entirety as if completely and fully set forth herein.

As noted above, software systems and their constituent software components can include functionality for communicating with one or more other systems and components over one or more networks (e.g., 140), using one or more network ports, sockets, APIs, or other interfaces (e.g., 255, 260, 265), among other examples. Some applications can include front-end, user-facing services and applications that further include user interfaces (e.g., 262) for presenting at least some of the outputs and results of a transaction to a user. Such user interfaces can further accept one or more inputs or request values provided by a user, among other examples. Applications, software systems, and software components can perform any variety of tasks or services and be implemented using potentially any suitable programming language, architecture, and format. Further, test system 205, test-related components (e.g., 230, 232, 234, 235, 236, 238, etc.), virtualization system 210, etc. can be implemented so as to flexibly support analysis, virtualization, and testing of any variety of software systems, programming languages, architectures, and the like utilized by applications and software systems 215, 220, 225, among other examples.

Figure 3:
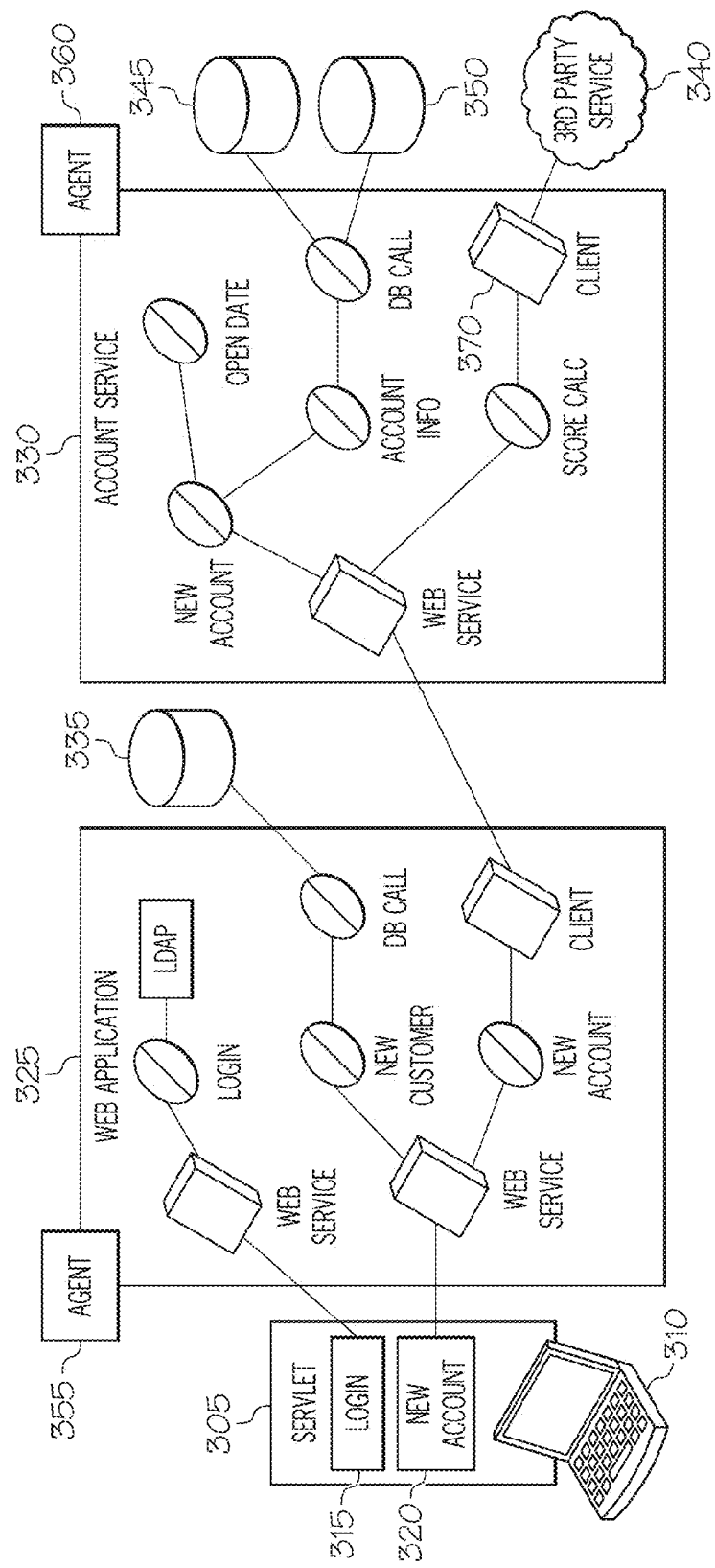
FIG. 3 is a simplified block diagram of an example system to be tested in accordance with at least one embodiment.

Turning to FIG. 3, a simplified block diagram is shown representing, for purposes of illustrating certain principles of this disclosure, example software systems and components capable of engaging in one or more transactions. It should be appreciated that the example systems and transactions are non-limiting, simplified examples and that a potentially limitless array of real-world systems and transactions can be monitored, analyzed, and tested in accordance with the principled outlined herein.

Figure 4A:
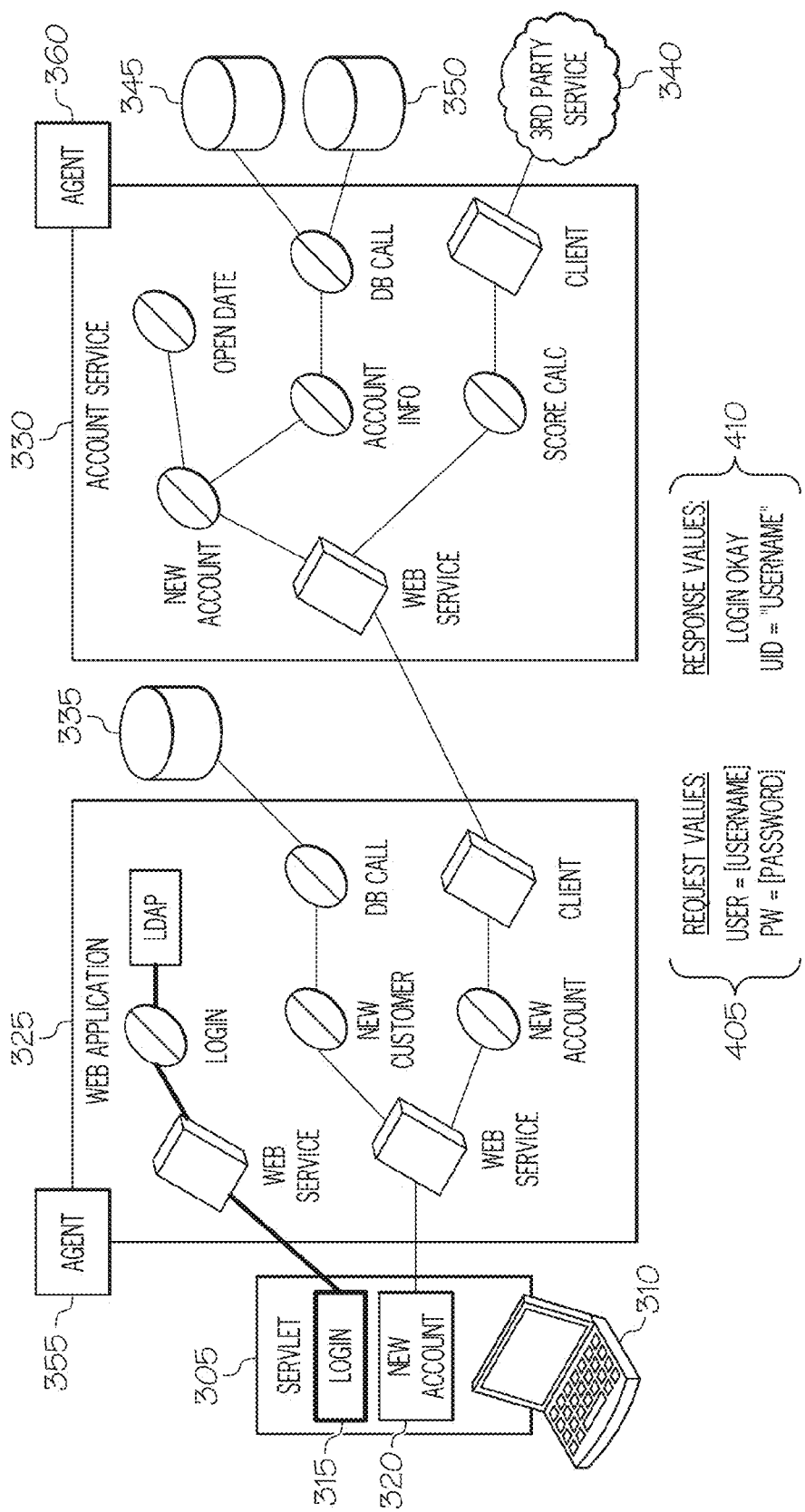
FIGS. 4A-4F are simplified block diagrams illustrating transaction flow paths involving the example system of FIG. 3 in accordance with at least one embodiment.

In the particular example of FIG. 3, a servlet component 305 is provided as a front end for an example Login transaction 315 and New Account transaction 320 accessible to users of user computer devices (e.g., 310). The Login transaction can involve calling a web service of a web application 325 and use of a Login software component (e.g., implemented in this particular example as JavaBean software components) and Lightweight Directory Access Protocol (LDAP) system to facilitate the logging-in of a user into an account of the web application 325. FIG. 4A illustrates the flow path of the example Login transaction 315 as well as example request values 405 of the Login transaction together with example response values 410 returned in the transaction in response to the request values 405. For instance, Login transaction can include a user-provided username and password pair (provided through servlet 305) resulting in a Login Okay response value when the provided username-password pair matches the username-password pair of an existing account managed by the LDAP system of web application 325. Further, the identity of the username can also be returned, for instance, in a welcome message identifying the username.

Figure 4B:
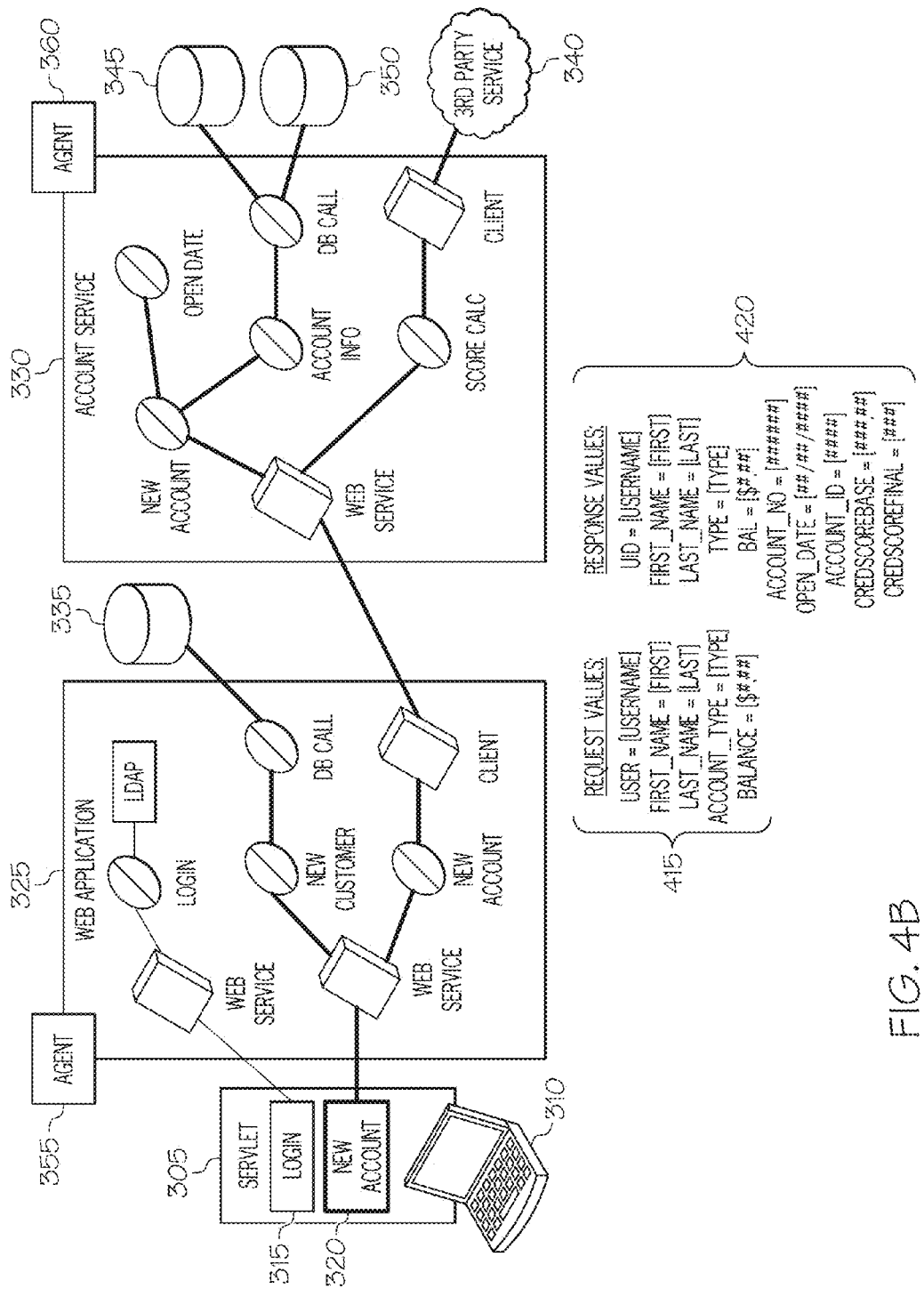

Returning to FIG. 3, additional transactions can be provided and identified. For instance, the New Account transaction 325 can support the creation and storage of a new account, such as an account for an ecommerce, banking, media subscription, or other application or service. For instance, as shown in the example of FIG. 4B, a more complex flow path can be identified for the New Account transaction 325 including multiple branches in the flow path. For example, upon creation of a new account (using New Account transaction 325) corresponding account information can be entered into a database 335 maintained outside of web application 325 and account service 330. The account information can be generated by one or more software components, such as by software components of account service 330, database 345, third party service 340, or other services and entities. New Account transaction can accept inputs or request values 415, such as username, first name, last name, account type, and account balance (e.g., for a loan, bank, e-payment, or other financial account). These request values 415, when processed in the transaction, can cause the retrieval, generation, and return of response values 420 including response values (such as values corresponding to user ID, first name, last name, account type, and balance) that are at least partially dependent or predictable based on values of the request values 415, as well as additional response values (such as values of an account number, account open date, account ID, credit score, etc.) that are not derived from or based on any of the request values 415. Such response values (e.g., account number, account open date, account ID, credit score) that are at least partially independent of request values 415 of the transaction can be considered dynamic values that are not easily derivable or predicted from the request values 415. In traditional testing systems, dynamic response values that are not tied to or at least partially echo request values may be difficult to test and verify and, in some cases, are simply ignored for purposes of the test.

The flow paths of each respective transaction involving a particular software component or system can be represented in transaction path data generated, for instance, using a transaction path engine. Transaction path data can be generated by grouping and correlating transaction fragment information included in transaction data and/or agent data captured and generated by one or more agents 355, 360 deployed on the software components and/or systems involved in the transactions, as illustrated in the example of FIG. 3. Some software components, such as third party service 340, may be unmanaged in that they are not instrumented with agents under the control of or otherwise accessible to a transaction path engine, test engine, or other tool or entity monitoring the transaction. The involvement and functionality of such unmanaged software components may remain unknown to the tools utilized in the development of transaction paths and tests of a particular transaction, and can be effectively regarded as a black box within the transaction that accepts certain monitored requests and returns corresponding responses captured, in some instances, by the agent (e.g., 360) of a neighboring monitored software component (e.g., SOAP client 370) receiving the response value from the unmonitored component (e.g., third party service 340), among other examples.

Figure 4C:
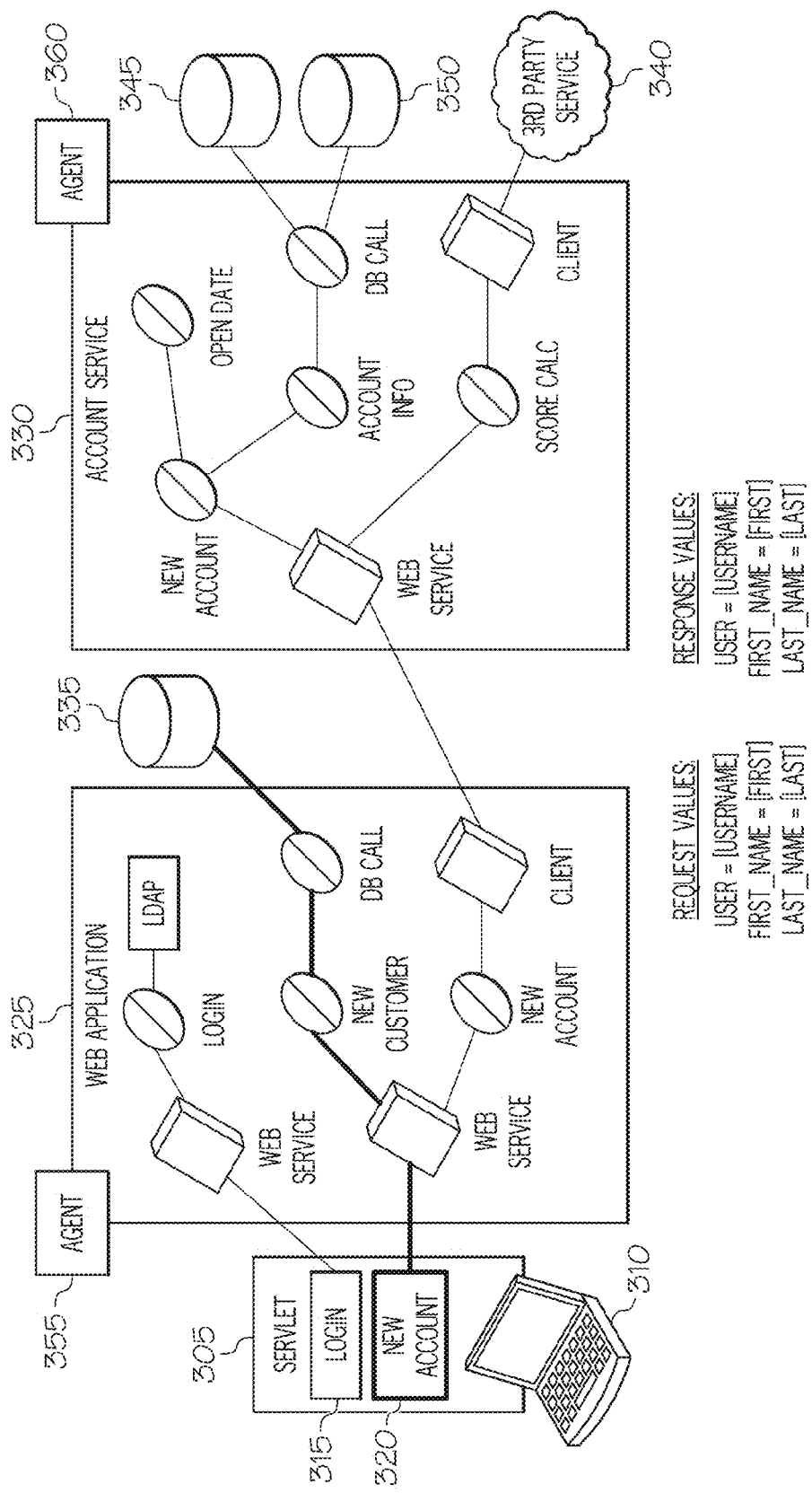

In some implementations, a single transaction can include the generation, communication, and use of multiple different response values. The generation and processing of various data within a transaction can involve the transmission of request values and response values to multiple different software components along multiple different sub-paths, or branches, of the transaction flow path. For example, FIG. 4C shows an example of a first branch of a transaction flow path shown bolded in FIG. 4B. The flow path branch of FIG. 4C shows a path for generating and storing a response value in database 335. For example, a response value can be generated or communicated by a New Customer software component for a new customer record utilizing other account information generated in the transaction. Response values such as UID, First_name, and Last_name may be provided from or generated by a New Customer software component or from a database call of database 335, among other examples. The actual values of UID, First_name, and Last_name, in some examples, can be obtained from request values provided by a user, such as the request values User, First_name, and Last_name. In some examples, proper operation of the New Customer software component may be evidenced by the generation of response values UID, First_name, and Last_name that echo request values User, First_name, and Last_name, among other examples.

Figure 4D:
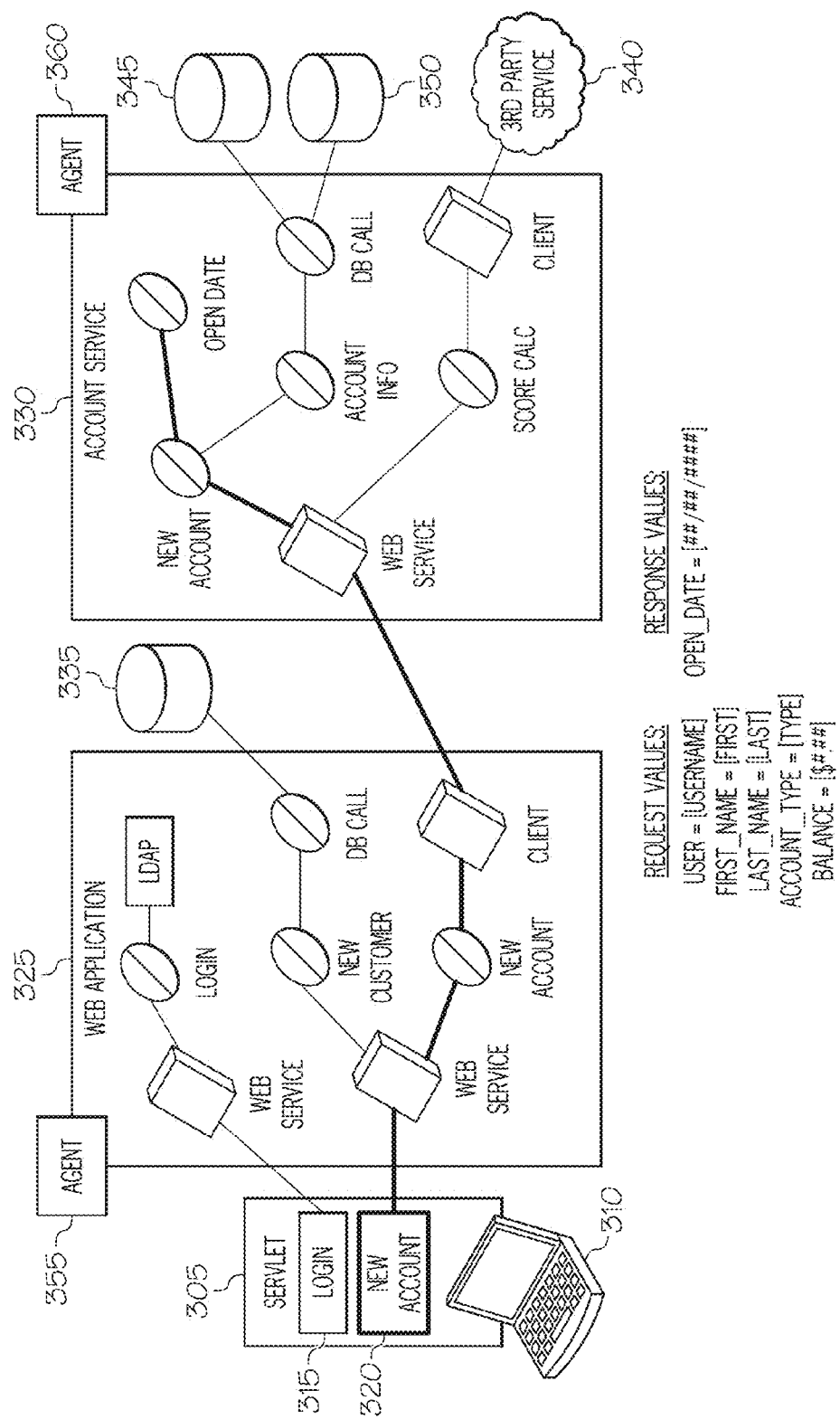

FIG. 4D illustrates another branch of an example New Account transaction, such as the New Account transaction introduced in the example of FIG. 4B. An account open date (e.g., Open_date) can be one of the response values returned in connection with the New Account transaction. In one example, an Open Date software component can include the logic for generating an account open date to be associated with a record to be provided to database 335 corresponding to the opening of the new account in connection with the New Account transaction. The account Open_date value can be generated by the Open Date component in response to a call from a New Account component of account service 330. The New Account component can additionally manage the generation of additional account data, such as by the Account Info component. The New Account component can be called through a web service call (such as a SOAP call) from web application 325 to account service 330 triggered by a New Account component at web application 325. Accordingly, as shown in the example of FIG. 4D, the invocation of an Open Date software component object can be triggered through a series of calls originating at servlet 305 and the response value Open_date can be generated and passed back from the Open Date component as a response over the same transaction flow path branch to be returned to servlet 305. The value of Open_date can be passed and reappear at each of the components upstream (i.e., in the direction of the flow path toward the software component originating the transaction request (e.g., servlet 305)). The Open Date software component can be identified as the source of the Open_date response value based on an identification of the Open Date component as a leaf in the transaction flow path branch corresponding to the Open_date response value. The Open Date software component can be identified as the leaf of the transaction flow path branch based on, for example, transaction data illustrating that the Open Date software component has no children components but is, instead, only a child component of other components with respect to the Open_date response value and the corresponding transaction path branch, among other examples.

Figure 4E:
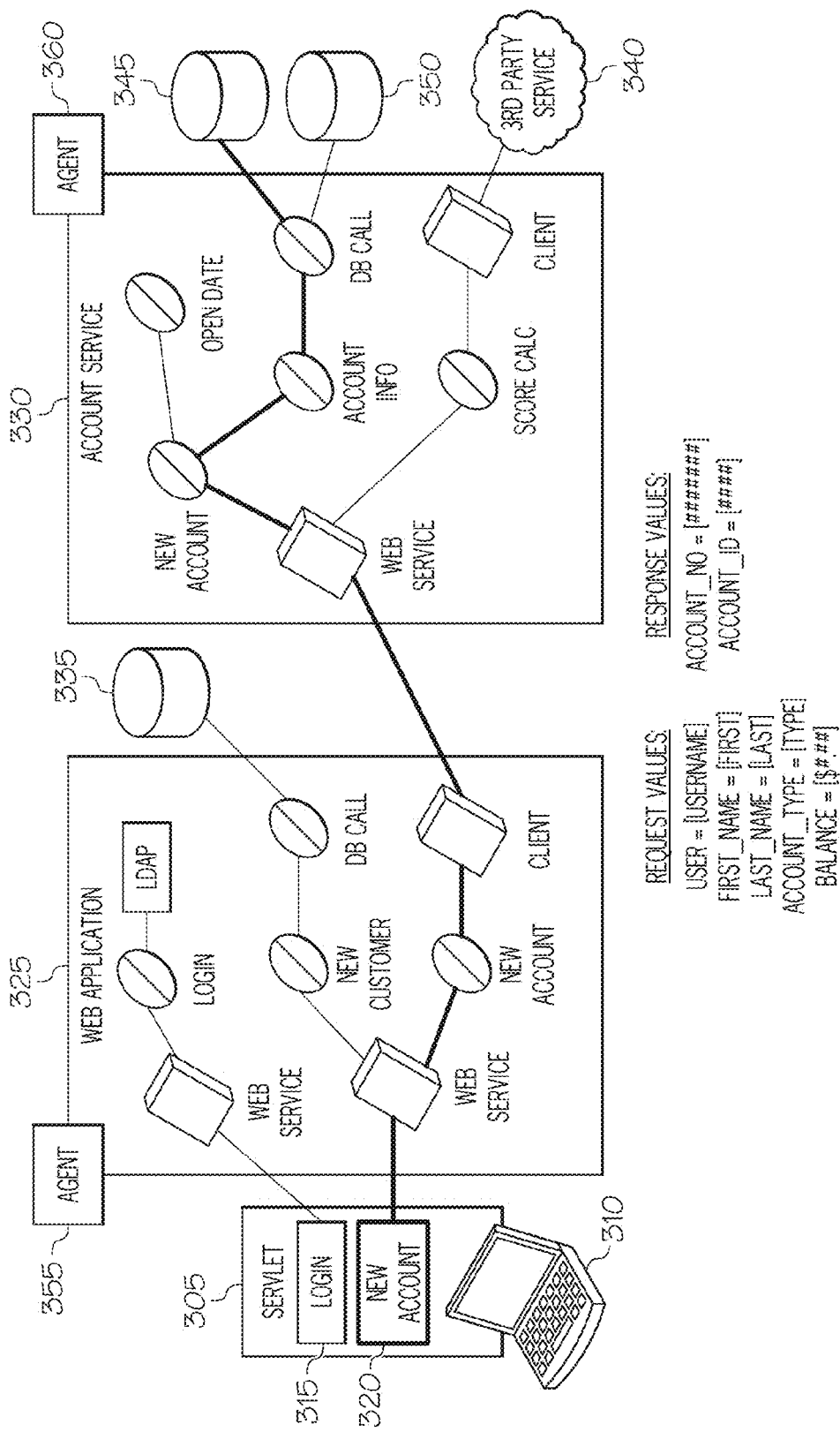

The example of FIG. 4E illustrates another example transaction flow path branch, in this case, relating to the chain of requests resulting in the generation of response values Account_no (e.g., providing the new account number generated for the account) and Account_id (e.g., corresponding to a database record for the new account), generated, for instance, by an unmonitored software component, such as database 345 or other data store, external to monitored software systems 325, 330, among other examples. The values of Account_no and Account_id, as with Open_date, may be independent of the request values provided in the transaction and involve calls by software components across application boundaries and networks connecting two disparate applications (e.g., 325, 330). For instance, the New Account software component of web application 325 may call the New Account software object of account service 330 using a web service call. An Account Info software component of account service 330 may in turn be called to generate values for the new account. For example, a database component 345 may include logic for auto-incrementing account number values (e.g., Account_no) for each new record that is added to the database 345. It can be identified that a database call was made to database 345 and that such a database call is a leaf of the transaction path branch. Further, it can be identified that the database 345 is the source of a particular value, such as in the example of FIG. 4E. Although the database 345 is not monitored by an agent, in some implementations, a transaction path engine or other tool can recognize certain types of calls to external components, such as SQL database calls, inverted list database calls, virtual storage access method (VSAM) calls, indexed sequential access method (ISAM) calls, flat file queries, and Cache database calls, among other examples. Through such types of calls, the transaction path engine can make certain assumptions about the nature and operation of the external component. For instance, in the example of FIG. 4E, in instances of a SQL call to component 345, the SQL call can be identified, by an agent 350, and interpreted to conclude that component 345 is a database and the source of the value returned in response to the SQL call, among other examples. For instance, other types of calls can be used to implicitly identify the general character of a software component generating or returning a particular value in a transaction.

Figure 4F:
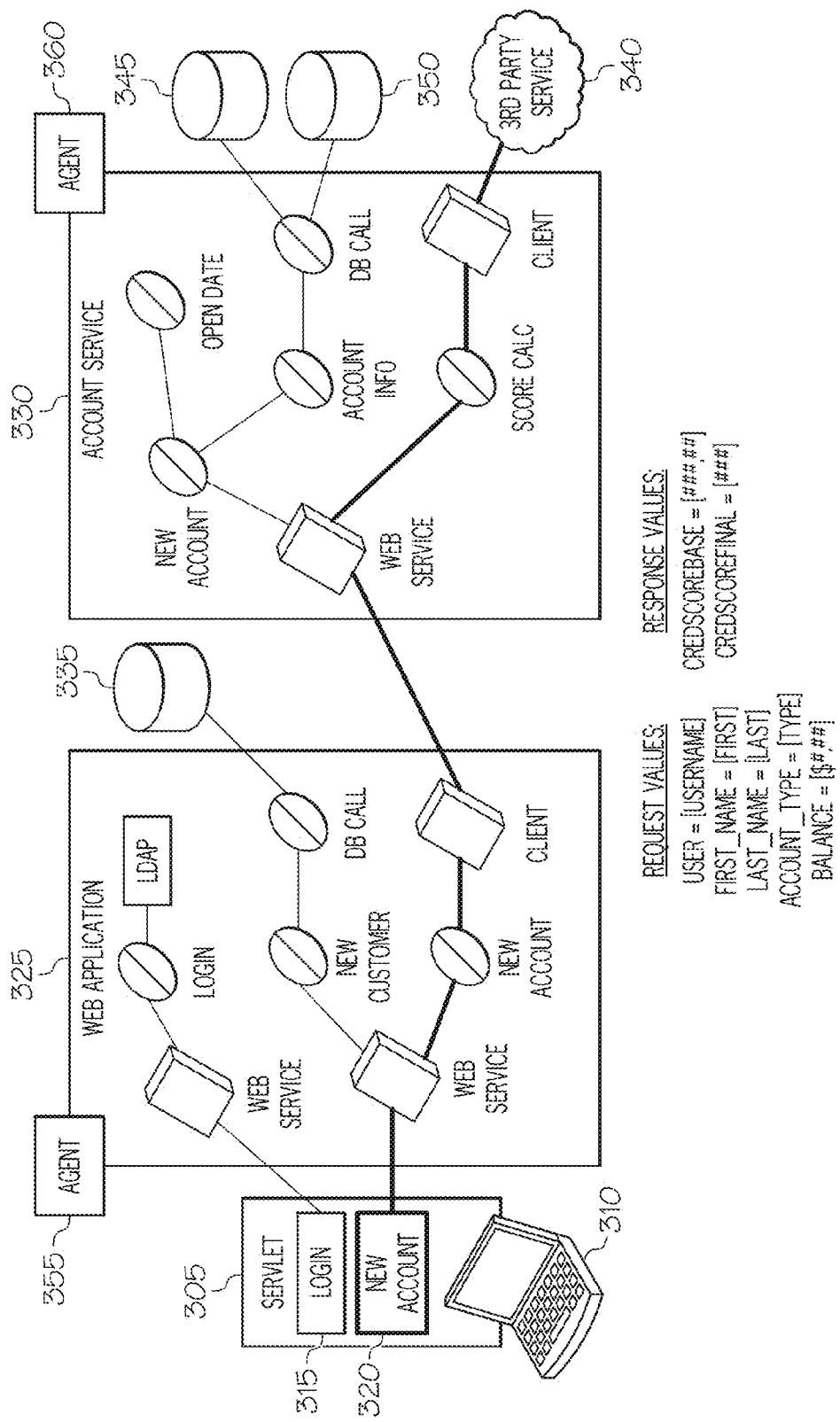

FIG. 4F illustrates another example transaction path branch involving a call to an unmonitored third party service 340. Transaction data collected or generated by agents 355, 360 can be processed to create transaction path data that can be analyzed to identify that a CredScoreBase value is returned from a third party service 340 and that the CredScoreBase value is utilized by a Score Calc software component to generate a CredScoreFinal value. Accordingly, an analysis of the corresponding transaction path data can result in the identification of the third party service 340 as the source of the CredScoreBase value and the Score Calc component of the account service 330 as the source of the CredScoreFinal value. As the third party service 340, in this example, is unmanaged, agents 355, 360 used to monitor the transaction are left without intelligence regarding how the CredScoreBase value is generated within the third party service 340, whether other external services are called in connection with the generation of the CredScoreBase value by the third party service 340, and so on. On the other hand, the agent 360 monitoring Score Calc component can identify with precision that the CredScoreFinal value was generated by the Score Calc component based on a CredScoreBase value returned from the unknown third party service 340. Further, agent 360 can capture the value returned by third party service 340 through monitoring of web service client 370, Score Calc component, etc.

Tests can be generated from transaction data collected, for instance, by agents 355, 360, to perform tests of one or more web application 325, account service 330, and their constituent components. Tests can include one or more test checks, or other actions, for use in verifying the correct operation of one or more software components under test. In one example implementation, the nature of a particular response value and its dependency on one or more request values can be identified. For instance, transaction data can be correlated from consecutive transaction fragments and identify, for instance, from clock or timing data, or through a comparison of data included in requests and responses, that a particular response value corresponds to a particular request value. Such approaches can be useful, for instance, when the data value name used in a request differs from the corresponding response value names. For example, in the example of FIG. 4A, a Login transaction can involve a user, through servlet 305, providing a request value User. A response value of one or more software components involved in the transaction can return a value labeled UID that is dependent on and is to echo the value of User. In some instances, both the response and request values will possess the same variable name, object name, or other labeling, while in other instances, such as the above example, the response and request values will be labeled differently despite their dependence or the reality that the differently labeled values refer to the same thing (e.g., [Username]). A transaction path engine or other tool can nonetheless correlate the User request value to the UID response value based on an identification of a common value shared by each (i.e., [Username]), as well as potentially other corroborating information, such as the time each value was received, identification that the software component returning the UID response value is a child of another software component sending the User request value, an identity of a common thread, among other examples.

Figure 5A:
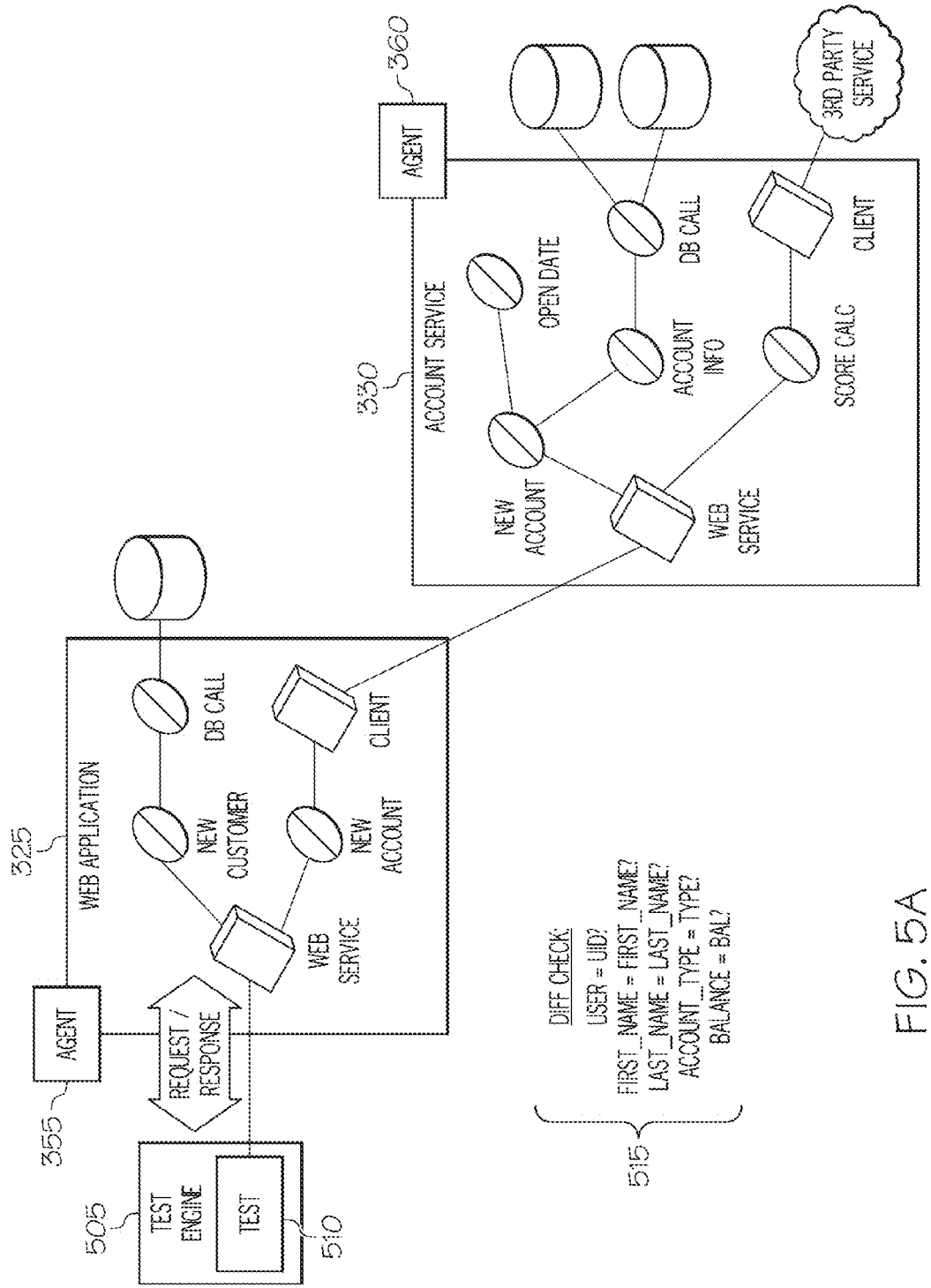
FIGS. 5A-5C are simplified block diagrams illustrating example test checks generated for portions of the example system of FIG. 3 in accordance with at least one embodiment.

Turning to the example of FIG. 5A, test checks (also referred to herein as test actions) can be generated based on the nature of a particular response value, whether the response value is directly dependent on one or more request values, as well as the identity of the source of the response value. Dependency of a response value on a request value, the identity of the source of the response value, and other information used to determine and generate a type of test check can be identified from transaction data and transaction path data. For instance, in the example of FIG. 5A, test checks can be generated in connection with tests of the example New Account transaction 320 introduced in the examples of FIGS. 3, 4B-4F. Some of the response values can be identified as echoing request values provided by a user or client (e.g., the servlet 305). For instance, it can be determined from transaction data and/or transaction flow data that the response value UID is to at least partially echo a request value User, that First-name is to at least partially echo First_name, that Account_type is to at least partially echo Type, and so on. A response value can partially echo a request value in that it adopts only a portion of the request value, adds to the request value, reformats the request value, etc. The manner in which a response value alters a request value can also be identified and considered. For instance, in some instances, a response value can concatenate or otherwise combine, or echo, portions of two or more request values and the relationship between these request values and the response value can be identified. Similarly, different portions of a single request value can be echoed in two or more distinct response values, among other examples.

In such instances, where it is determined that a particular response value at least partially echoes a particular request value, a differential test check can be automatically generated (e.g., using an example test generation engine) to check that the particular response value consistently echoes (or at least partially echoes) the particular request value. As an example, during monitoring of the New Account transaction, an agent can detect request values and response values and it can be determined, from agent data, that when an Account_type variable is assigned a value "Checking" (or "Savings", "Money Market", etc.) that the Type response value returned also has the value "Checking" (or "Savings", "Money Market", etc.). Based on this determination, a corresponding differential test check can be generated to check that the Type response value matches the Account_type request value in tests of the New Account transaction involving at least the relevant software components of web application 325. In the example of FIG. 5A, it can be further identified that differential test checks would be appropriate to correspond to the verification of such response values as UID, First_name, Last_name, Type, Bal, among other examples. Accordingly, a test generation engine can identify the relationship between a request value with a particular response value and generate a differential test check that verifies the at least partial echoing of the request value by the response value during a test, as represented, for instance, in FIG. 5A.

A test engine (e.g., 505) can execute a test (e.g., 510) including one or more test checks, including one or more differential test checks (e.g., 515). In one example, a test engine 505 can perform tests that cause test request values to be provided to the system under test, such as automatically generated test request values. For instance, test 510 can include test data (or logic that generates test data), such as an array of request values that can be provided to the systems and components under test to verify (e.g., using test checks) the systems' and/or components' correct responses to the test values. For example, test request values of First_name="Jim" and Last_name="Powell" can be entered, and respective differential test checks can verify that response value First_name also equals "Jim" and that the response value Last_name also equals "Powell", among other examples. If the corresponding response value echoes the request value as defined in the test check, then the test check can return a test result value verifying a successful transaction with regard to the at least partially echoing of a request value by a response value, among other examples. Similar differential test checks (e.g., in test checks 515) can also be run against the test request values to verify, for each check, the appropriate response of the systems (e.g., 325) and components under test.

Figure 5B:
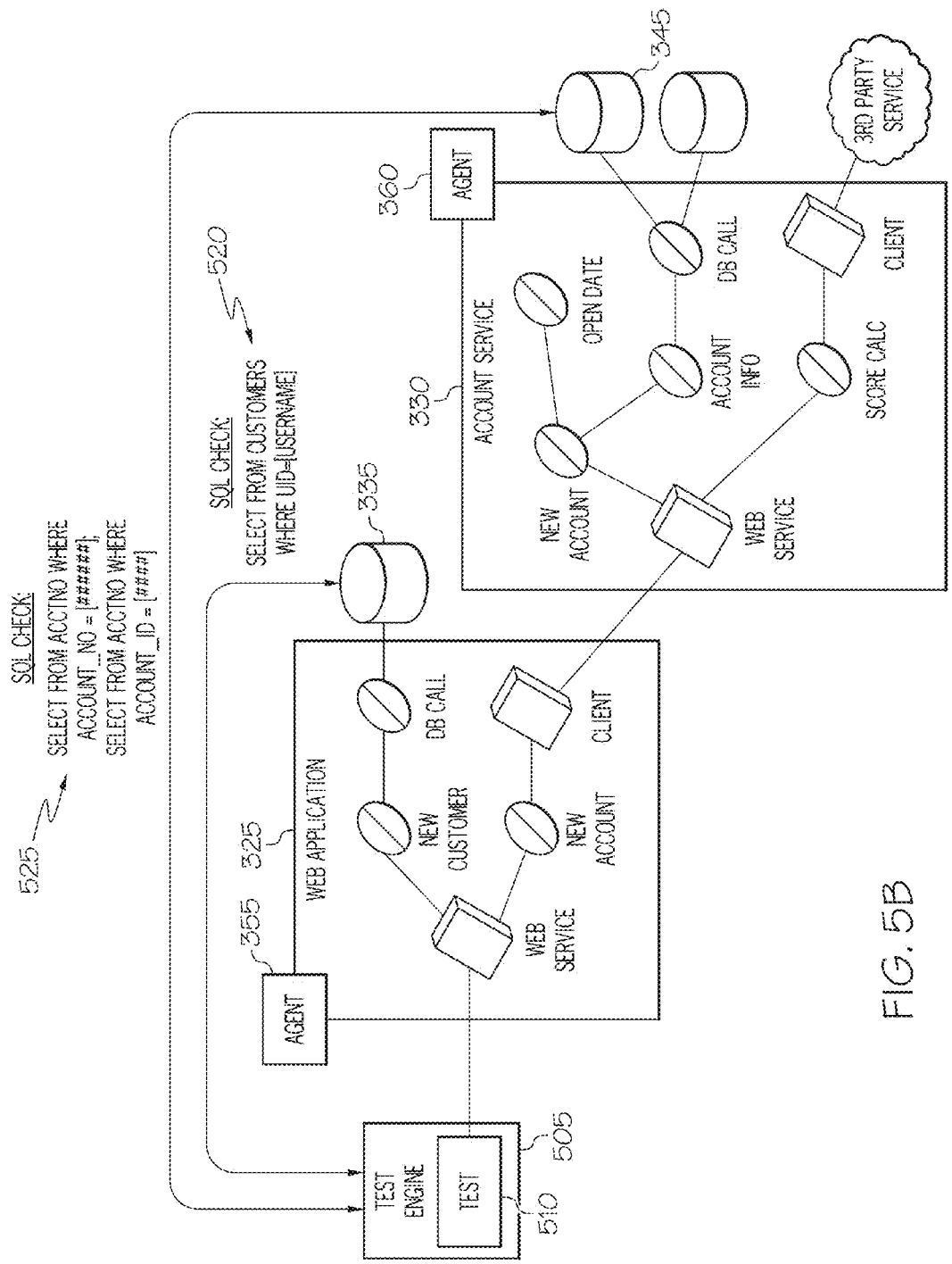

Turning to FIG. 5B, tests (e.g., 510) can further include additional types of test checks, including test checks that can be used to verify values generated deep within the operation of the system(s) under test (e.g., 325, 330). As noted above, transaction flow data for a particular branch of a transaction can be analyzed to identify a likely source of a particular response value of the transaction (i.e., the software component responsible for originally generating the response value). As noted in the previous example, in some instances, a response value can be generated by a software component so as to echo, confirm, or otherwise apply values received in a request value of the transaction. In other cases, however, a response value can be wholly or partially independent of the request value or include dynamic values. Given the relative unpredictability of such response values, traditional testing systems often ignore the validation of such values, resulting in substantial holes in the analysis of a system under test.

As discussed above, in some instances, analysis of a transaction flow path (e.g., as embodied in transaction data and/or transaction path data) can result in the identification of the transaction flow exiting the boundaries of a monitored software system to an external component. In some instances, based on request and response data captured in transaction data or agent data, the nature and characteristics of the external software component can be identified. For instance, as shown in the example of FIG. 5B, transaction data (or agent data) can be analyzed to identify a call to a database as evidenced, for example, by data identifying a SQL-based call to a particular software component (e.g., databases 335, 345). Additionally, the identification of a type of software component, including external components, can serve as the basis for determining that a verification test check can be generated to test and validate response values handled by the software components.

In the example of FIG. 5B, an opportunity to generate a test check relating to external database 335 can be identified based on observed SQL-based calls to the database 335 (e.g., as observed and documented by agent 355). For instance, it can be identified further, from the transaction flow path, that a New Customer component initiates a database call that populates database 335 with response values that are to be returned by the web application 325. Accordingly, a test generation engine can build a database check utilizing principles of SQL, or another database management language, to query the database to validate that the database (and database call software component of web application 325) is operating correctly and that correct data has been stored at the database 335 during a test involving the New Account transaction. For example, a database test check can be generated that recognizes (e.g., from agent data capturing observed calls to the database 325) how certain values are stored in the database 325. Using this intelligence, a database test check 520 can be generated and added to test 510 that queries the database 325 for response values generated by New Customer software component in response to certain test request values provided by test 510. For instance, the database test check 520 can observe the response value for UID and use this value to populate a query for records of database 335 matching the identified value for UID. The test check 520 can send this populated query to the database 335 and receive results of the query. If an empty set, error, or unexpected data (e.g., other response data values not matching the response data values for a new account record associated with the particular UID value, such as a different first or last name than expected) is received from the database 335, the database test check 520 can return result data indicating an error. If however, the database test check 520 identifies that the data returned by the test-check-driven query of database 335 is as expected for the value of UID, the test check 520 can return result values that indicate that the operation and response values processed by database 335 have been validated.

In another example, additional SQL queries can be identified involving a database call of account service 330 and a database 345. From agent data, transaction data, and/or transaction flow data, it can be further identified that the source of one or more response values (e.g., Account_no and Account_ID) is the external database 345. As in the previous example, a test generation engine can identify that database 345 is a software component of a known type (e.g., a SQL-compatible database) and formulate a test check configured to validate response values generated by that software component type (e.g., database). In this example, a response value Account_no and Account_ID can be returned at the client of the transaction, modeled by test engine 505. The database test check(s) 525 can be configured to identify the values of Account_no and Account_ID and build SQL queries (or other queries corresponding to the type of the external database 345, such as a VSAM query, Cache query, flat file query, etc.) for each value to determine if any values have been generated and stored in database 345 with the values returned from the tested transaction. To illustrate, in one example, a set of test request data can be provided by the test engine 505 to the web application 325. The web application 325 can operate as programmed and cause the account service 330 to be invoked leading to an Account Info software component initiating a database call to database 345. The database, as predicted from transaction path data for the transaction, can generate a value for Account_no and this value can be passed back through the transaction path of software components to test engine 505. In this illustrative example, Account_no can be returned with a value of "43210". A test check 525 can further be invoked to verify the value of Account_no at its source, database 345. The test check 525 can build a SQL query from the returned value of Account_no to determine whether any records exist in database 345 as well as corroborate other data associated with the Account_no value, such as a value for Account_ID, Type, Last_name, etc. In thus example, the test check 525 can cause database 345 to return a query response of "No records", indicating that another software component involved in the transaction path inappropriately altered the original value of Account_no provided by database 345, among other examples.

Figure 5C:
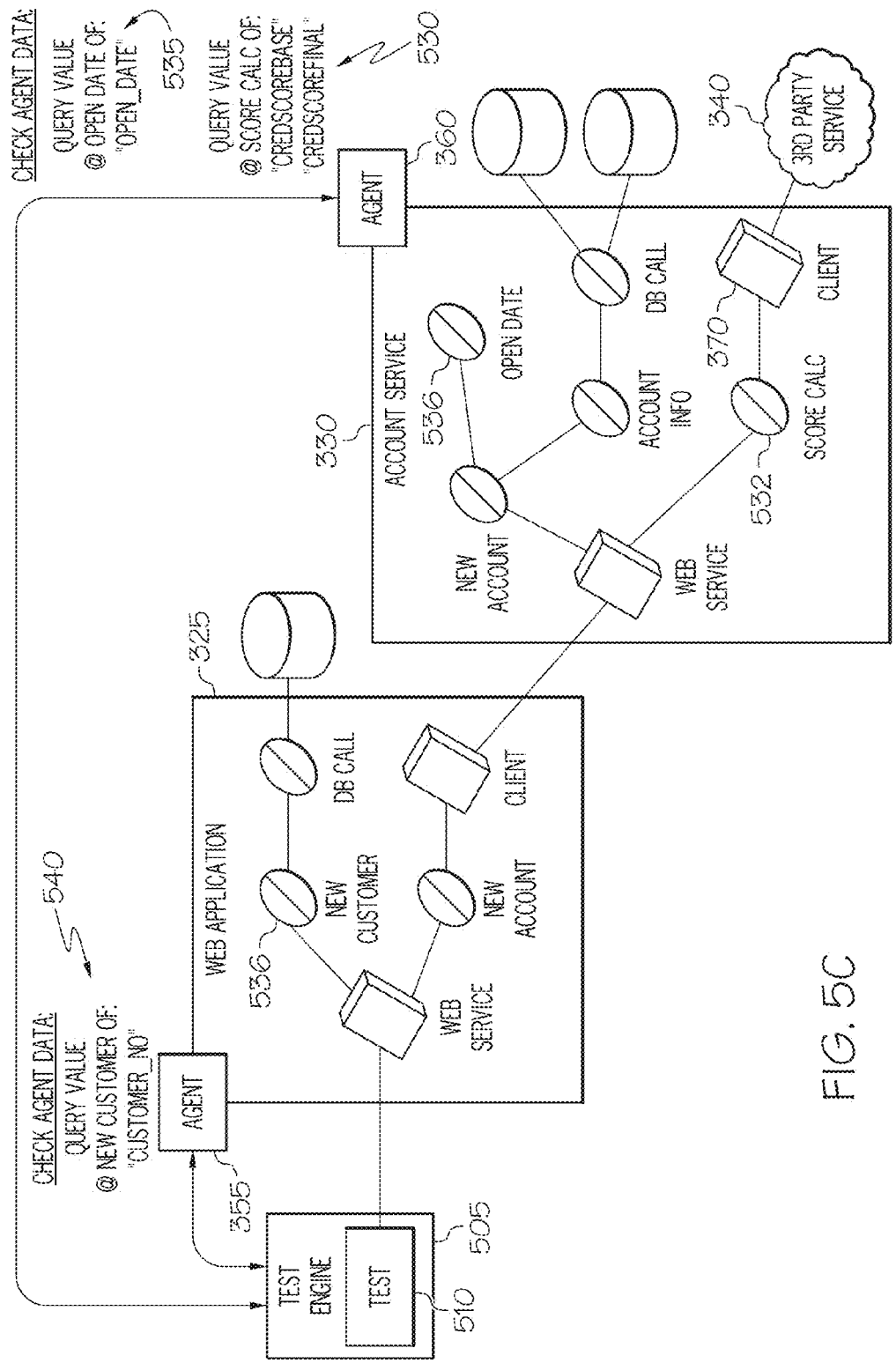

Turning to FIG. 5C, still other types of test checks can be generated from information gleaned from agent data, transaction data, and/or transaction path data. While in the examples of FIG. 5B, an external source of a particular response value was identified together with the type of the external source (e.g., a database), in some instances, it can be determined that a given response value is generated by an unmonitored, or external, source of unknown type, such as an example third party service 340. As noted above, an unmonitored source may not be monitored by an agent, or at least an agent accessible to a testing and transaction path analysis system, etc. under control or available to an entity conducting tests of a particular software system making use of the third party service 340. Accordingly, it may not be possible, in some instances, to precisely pinpoint and invoke and verify the precise software component of the third party service responsible for generating the response value in question.

In some examples, a test check can be generated in response to determining that a response value (e.g., "CredScoreBase") likely stems from an external or otherwise unmonitored source (e.g., 340). In one implementation, an agent-based test check (e.g., 530) can be generated in response to identifying that the source of a particular response value is an unmonitored external source. Further, transaction path data can be consulted to identify a monitored software component (e.g., 370, 532, etc.) nearest to the unmonitored source in the transaction flow path. For instance, the nearest upstream (i.e., in the direction of the response flow toward the requesting client) monitored software component can be identified from the transaction flow path data and an agent corresponding to the neighboring monitored software component can also be identified, for instance, from the transaction path data, transaction data, and/or agent data.

In some instances, agents (e.g., 355, 360) of software components involved in a test can be engaged to monitor the behavior, requests, and responses of their monitored software components during the test. The agents 355, 360 can generate and maintain agent data describing the monitored behavior. Generation of an agent-based test check 530 of unmonitored third-party service 340 can involve the identification and accessing of the agent data of an agent (e.g., 360) monitoring a software component (e.g., Score Calc component 532) in proximity of the unmonitored component. The agent-based test check 530 can cause relevant agent data to be returned from agent 360 that was collected by the agent 530 during execution of the systems 325, 330 in connection with the test. The returned agent data can correspond to and describe the request to and response from third-party service 340 as observed by Score Calc component 532 (or SOAP client 370, etc.). From this agent data, the agent-based test check 530 can cause the best-available data to be returned that describes the response value as returned from the third party service 340 source, among other examples.

Agent-based test checks can also be generated to validate values from monitored software components within control of the entity conducting a test. For instance, monitored software components can also be identified as the sources of various response values from transaction path data (e.g., as discussed, for instance, in connection with FIG. 4D). Indeed, in the example of FIG. 5C, software component Open Date (536) can be identified as the source of response value Open_Date, software component Score Calc (532) can be identified as the source of response value CredScoreFinal, and software component New Customer (538) can be identified as the source of response value Customer No all from transaction path data for the transaction, as discussed above. Based on the identification that a monitored software component is the source of a respective response value, a corresponding agent-based test check can be generated and added to test 510. Each agent-based test check (e.g., 530, 535, 540) can be configured to access agent data of the respective agent monitoring the source software component for the tested transaction to identify the response value as returned directly from the source software component during the test execution of the transaction.

The response values captured by the monitoring agents (e.g., 355, 360) in an agent-based check can be compared against values ultimately returned in the transaction at a client (e.g., modeled in the test by the test engine 505) to identify whether the response value was properly handled and communicated across the transaction path. In other instances, prior observed transactions between two software components (e.g., 325 and 330) can evidence a relationship between a request value and a resulting response value beyond that the response value matches a portion of the request value. For example, in some implementations, date or time data (or other data) can be returned that while not identical to a request value, is nonetheless based on the request value. For instance, a pattern in observed transactions can indicate that the response values have a substantially constant value relative to their respective request values. As an illustrative example, a date response value may be identified that increments (e.g., two days, six hours, rounds up to the next day, hour, etc.) a date value included in the corresponding request. Such relations can be identified, in some instances, from virtual service models generated for the server side of a transaction, among other sources and examples. Further, identified relative relations between request and response values can be used by an agent-based check (or other check) to further verify that correct (or at least expected) values are being returned by a particular software component. As an example, the response value Open_Date may adopt a value relative to a date value or timestamp data of the request and verification of an instance of response value Open_Date can include verifying that the returned value is consistent with the relationship identified between the response value Open_Date and corresponding request values, among other potential examples.

While the examples of FIG. 5C describe agent-based checks to verify response values returned by (or in proximity to) the source of the response values, in some example implementations, additional agent-based checks can be generated and used to report performance of each monitored software component along a transaction path (e.g., to report how a particular response value is passed along the transaction path). This can be useful, for instance, in identifying where in a transaction path a particular error or inaccurate transformation of a response value occurred, etc. For example, values of a particular response value can be validated through agent-based checks generated and executed to extract agent data describing requests and responses at each monitored software component within a transaction path, among other examples.

Transaction path data can additionally be used to identify boundaries between software components, machines, and systems. In some instances, agent data can identify requests from one software component to another. Additionally, in some instances, agent data can additionally identify when a request from one software component or service to another traverses a network, network port, socket, or other hardware indicating that the software component, service, or system are hosted on different machines and potentially also on systems controlled by distinct entities. Still further, an agent can identify the boundaries of its own monitoring, and an agent boundary can additionally serve as an identifier of a boundary within a transaction (e.g., between distinct software components or systems in the transaction).

In many modern systems, a transaction may involve multiple systems, including systems controlled by distinct entities. As discussed above, testing of a system can be difficult when the system is dependent on other systems in one or more transactions to be tested. The other system may be a live system, a system controlled by a different business unit, corporate entity, or third-party. While the system under test may be permitted largely unfettered access to the other system during live operation, performing tests, training, or development in connection with the other system may interfere with the other system's operation, among other access problems. Accordingly, as introduced above, some tests may attempt to model or virtualize other systems involved in a test. For example, a system under test may receive and respond to inputs by another system. In order to test the system to observe how it would respond during live operation with the other system, a test, or "baseline", can be developed that models the behavior (e.g., the requests) of the other system. In other instances, the system under test may also, or alternatively, consume data and services hosted or served by another system that has limited availability in connection with the test. In such instances, a virtual service can be generated to stand-in for the other system to which requests will be generated by the system under test.

Figure 6A:
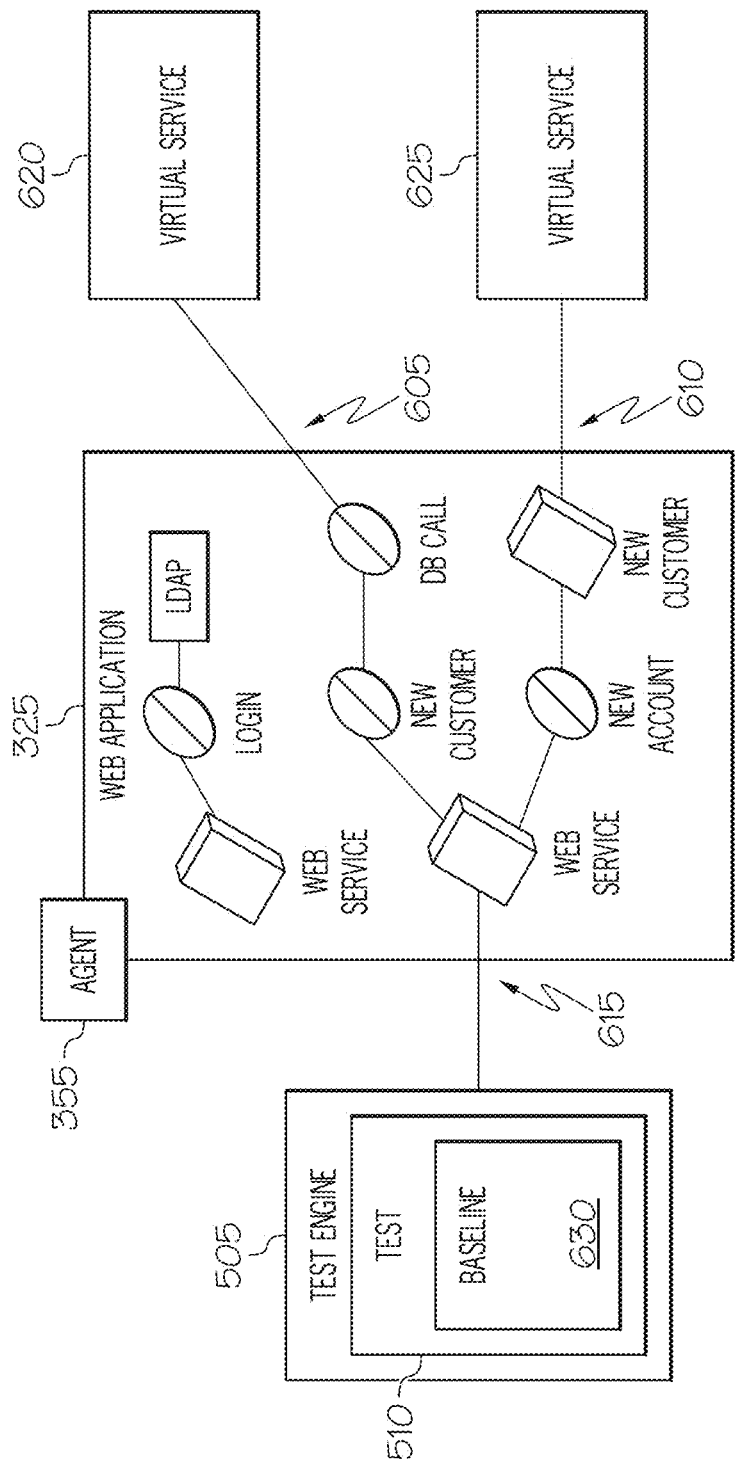
FIGS. 6A-6D are simplified block diagrams illustrating opportunities to virtualize one or more components of the example system of FIG. 3 in accordance with at least one embodiment.

Turning to the example of FIG. 6A, the systems illustrated in FIG. 3 can be observed by one or more agents (e.g., 355), and a particular agent 355 can identify one or more transaction boundaries. For instance, transaction boundaries can be determined by identifying requests and calls made by a software component monitored by the agent 355 that involve transmissions over a socket, network port, or other interface indicating the boundary of an agent's ability to monitor the transaction, or, in other words, the boundary of a particular monitored system or component. For instance, in the example of FIG. 3, an agent 355 monitors the constituent software components of web application 325 and can identify when a request of one of its monitored software components traverses the boundaries of the web application 325 over one or more interfaces 605, 610, 615 outbound to another system or component. In the example of FIG. 3, requests leave the boundaries of web application 330 destined for either external database 335 or account service 330. An agent 355 monitoring these outbound requests can identify that the requests are bound for other distinct, and in some cases external, software components or services. This can be determined, for instance, from socket identifiers, IP addresses, request types, port identifiers, or other identifying characteristics of the interface and/or communication between the component and another outside components (e.g., 330, 335). Further, agent 355 can identify that incoming requests originate from one or more outside components, such as a servlet, web browser, or other component (e.g., 305), including user-driven clients, etc.

Based upon the identification of component or system boundaries within a transaction, opportunities can be automatically identified (e.g., by an example test system) to virtualize external components or systems identified as sending requests or responding to the monitored system or software component (e.g., 325). In the example of FIG. 6A, one or more outbound boundaries of web application 325 can be identified for a transaction from agent data, transaction data, and/or transaction path data based on the monitoring of agent 335. In this particular example, two outbound boundaries (e.g., corresponding to the destination of requests of the monitored system 325) can be identified. Further, agent data and/or transaction data can be consulted that document interactions between the monitored system or components and the outside entity (e.g., service 330 or database 335). For example, a history of requests and responses captured in agent data or transaction data can be used to automatically generate a model, or virtual service (e.g., 620, 625), of the respective outside entity, according, for instance, to the principles described in U.S. patent application Ser. No. 13/341,650 entitled "Service Modeling and Virtualization," among other examples.

Further, an agent boundary 615 can be used to identify an opportunity to generate a model, or baseline, of the outside entity (e.g., 305) sending requests to the monitored system 325. Agent data and/or transaction data can also be used to automatically generate a baseline 630. A baseline can be programmatically configured to generate sample inputs or request values consistent with requests generated by a real world version of the modeled software component as documented by agent 355. The various behaviors, trends, and formatting captured in real requests can be extracted and used to configure a baseline to generate test request values mimicking similar behaviors, trends, and request formats such that the web application 325 considers the baseline to be a real-life client or requester, among other examples. Further, a baseline 630, as shown in FIG. 6A, can, in some examples, be included within a test (e.g., 510) generated for the system. As noted above, in addition to a baseline (e.g., 630) providing modeled inputs to the system under test, a test (e.g., 510) can include additional logic, including test checks (e.g., as discussed above) that can be used to evaluate how the system under test responds to the inputs provided by the baseline (e.g., 630), among other examples.

Figure 6B:
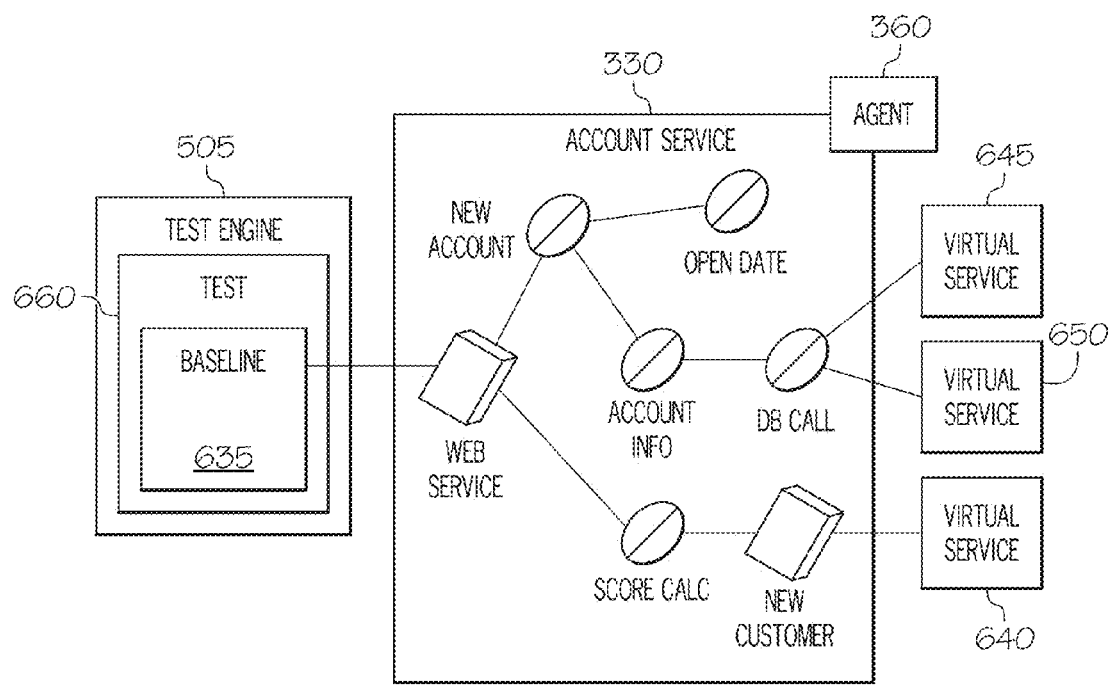
Figure 6C:
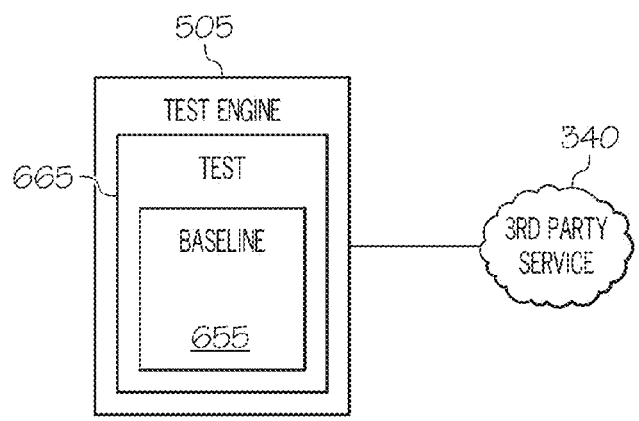

FIGS. 6B and 6C illustrate further examples of using the identification of transaction boundaries between software components, machines, or systems to identify opportunities to generate a complete set of baselines and virtual services for a monitored system. While a complete set of baselines, virtual services, and other models may not necessarily be utilized in any given test, identifying and generating a comprehensive set of models can allow such models to be available at any time, such as when a dependent or parent system is unexpectedly unavailable for use in connection with a test. The unavailable system can then be simply and conveniently substituted with the pre-generated baseline or virtual service within the test.

In the example of FIG. 6B, such baselines can be generated, for instance, for account service 330 based, for instance, on transaction boundaries identified from agent data collected by agent 360. For instance, boundaries between account service 330 and web application 325, third-party service 340, database 345, and database 350 can be identified based on requests or responses identified by agent 360 that exit or enter account service 330. Each boundary can be determined to correspond to an opportunity to generate a corresponding baseline and/or virtual service. For example, through the identification of transaction boundaries, each opportunity to generate a baseline or virtual service for potential use with account service 330 (e.g., development or testing of account service 330) can be identified. The identification of such opportunities can trigger the automated generation of corresponding baselines (e.g., 635) and virtual services (e.g., 640, 645, 650) from agent data and transaction data documenting requests, responses, and other behavior of the outside system or component (e.g., 325, 340, 345, 350, etc.) to be modeled.

In some instances, an agent (e.g., 360) monitoring a particular software system or component and corresponding agent data (or transaction data generated from the agent data) can be used to not only identify opportunities to virtualize other systems with which its system interacts, but also to identify opportunities to virtualize the very system it monitors. As shown in the example of FIG. 6C, it may be desirable to test external services and systems with which a particular system is designed to interact. In some instances, regression testing can be used to test the health of a third-party system (e.g., 340) depended upon by an entity's own system (e.g., account service 330). Rather than testing the third-party system with a live version of the entity's own system, a baseline can be developed of the entity's system for use in testing the third-party system. For instance, from agent data collected by agent 360, characteristics of account service's 330 interactions with and requests of third-party service 340 can be identified. For instance, agent data (and resultant transaction data) can be mined to identify historical and statistical trends identifying the manner and tendencies of the account service's 330 interactions with third-party service 340. As agents are not available for monitoring of the third-party service 340, in this example, an opportunity to virtualize account service 330 as a baseline (e.g., 655) for testing third-party service 340 may only be identifiable through the intelligence provided by agent 360 in connection with the corresponding identification of a boundary between account service 330 and third-party service 340 (e.g., based on the identification of an agent boundary, network communication between the components 330, 340, etc.). From this identification, corresponding agent data and/or transaction data can be identified describing the interactions between account service 330 and third-party service 340 and a baseline model 650 can be generated modeling the identified characteristics and behavior of account service 330.

As in previous examples, a baseline, such as baseline 635 in FIG. 6B, or baseline 655 in FIG. 6C, can be incorporated in a test (e.g., 660, 665) for the system (e.g., 330, 340) that is to be executed by a test engine (e.g., 505). Tests 660, 665, as in other examples, can additionally include other logic, such as test checks adopting principles discussed above, used to validate, invoke, and verify the operation of software components in the system(s) under test.

In some implementations, tools can be provided to present a graphical representation of a transaction flow path to a user to assist a user in understanding how a transaction flows from component to component. While such tools can be used by a user to manually identify and initiate generation of baselines and virtual services in accordance with opportunities identified by the user, such a manual approach can introduce human errors and in complex systems and transactions, analyzing transactions for boundaries that present opportunities for modeling one or more software systems or components can be quite difficult and time-consuming, among other challenges. Automatically identifying agent boundaries, and thereby also, boundaries of software systems and components in certain transactions with external systems and components can, among other potential advantages, more comprehensively identify opportunities to generate virtual models of the systems.

Figure 6D:
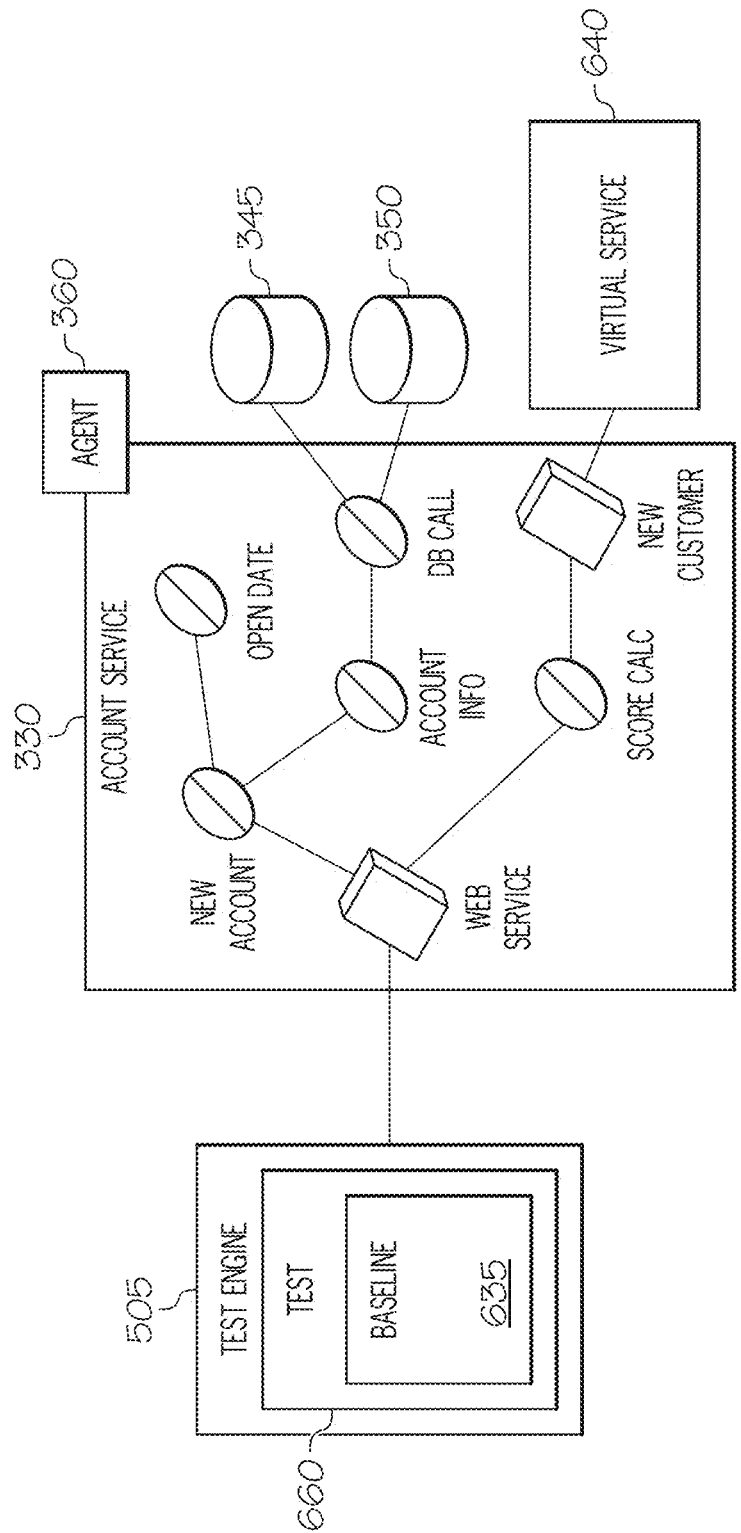

Turning to the example of FIG. 6D, upon identifying and generating one or more virtualized baselines (e.g., 630, 635, 655) or virtual services (e.g., 620, 625, 640, 645, 650) of the various systems and components within a monitored transaction, the baselines and virtual services can be maintained in a library and invoked and utilized in connection with one or more live systems, including systems in development, production systems, beta systems, training systems, systems under test, etc. In the case of a baseline, the baseline can be included in a test defined for a system or transaction and executed using a test engine tool (e.g., 505). With virtual services, a virtual service can be called and provisioned to execute, for instance, within a virtual machine or other environment to simulate the operation and existence of the modeled service or application within a test or simulation, among other examples.

In the particular example of FIG. 6D, a user may recognize (or a system may detect) that databases 345, 350 are available within the context of a particular test or simulation of account service 330 or transaction involving account service 330. Accordingly, the user can elect to conduct the test using the actual databases 345, 350 rather than virtual services (e.g., 640, 645) that have been generated and are available to simulate the databases 345, 350. Further, a user can elect to utilize a baseline 635 of client web application 325 in connection with this test, rather than the client web application 325 itself, resulting in the invocation and use of baseline 635 (and/or test 660 including baseline 635) to model client system 325. Finally, it can be determined, either by the user or a system, that use of third-party system 340 is unavailable or undesired in connection with the test or simulation, and the corresponding virtual service 640 that has been generated for third-party system 340 can be provisioned to simulate the presence and operation of the third-party system 340 within the transaction, among other combinations of virtual services and baselines, and other examples involving other systems with their own sets of virtual services and baselines that can be invoked and used in connection with a corresponding test or simulation.

FIG. 7A is a simplified flowchart 700a illustrating an example technique for generating a test action, such as a test check, for inclusion in a test of one or more software systems. Data, such as transaction path data, transaction data, agent data, or other data that represents or that can be processed to represent a path of a transaction can be identified 705. The transaction path can be identified, for instance, from relationships determined between multiple transaction fragments of the transaction involving multiple different software systems and their constituent components. Further, the data can identify one or more values, such as response values, that can be returned in connection with attempted completion of the transaction. A particular one of the software components can be identified 710, for instance, from the data, as a source of the value. Characteristics of the source software component can be identified and a test action can be generated 715 that when executed, can cause an attempt to verify the value at or as generated by the source software component. For instance, the test action can invoke the source software component and query the software component for the value it generated, processed, or was provided in connection with an instance of the transaction. In other instances, the test action can identify an agent tasked with monitoring the identified source software component and query agent data of the agent to verify the value as generated or sourced at the software component. In other instances, the test action can be generated 715 to query an agent monitoring another software component in communication with the source software component, for instance, upon a determination that the source software component or system is external to and outside the monitoring of accessible agents, among other examples.

FIG. 7B is a simplified flowchart 700b illustrating an example technique for generating a virtual model for use, for example, within a test of one or more software systems. In one example, data can be identified 720 such as transaction path data, transaction data, agent data, or other data that represents or that can be processed to represent a path of a transaction including multiple transaction fragments and involving multiple software components and/or systems. One or more transaction boundaries can be determined 725 from the data. A transaction boundary can signify, for instance, the boundary between one software component and another, one system and another, software components and/or systems communicating over one or more sockets, network ports, or other interfaces, and/or software components or systems monitored by different agents, etc. Opportunities to generate virtual models of systems and components on either side of the identified transaction boundaries can be identified 730 based on the identification of the boundaries. Further, the generation of the virtual models, including baselines and virtual services, as described herein, can be initiated 735 in accordance with the identified opportunities. Such virtual models can be employed in a variety of environments including, for example, a development, testing, load testing, integration testing, training, or other real or virtual environment, among other examples.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
    identifying data representing a path of a transaction, wherein the path comprises a plurality of transaction fragments associated with a plurality of software components, the transaction is to return a particular value, and the particular value is returned by a first one of the plurality of software components;
    determining from the data, using a data processing apparatus, that a particular one of the plurality of software components is a source of the particular value, wherein the particular software component is different from the first software component and passes the particular value in a particular one of the plurality of transaction fragments;
    determining, using a data processing apparatus, a type of test action for use in verifying the particular value as originally generated at the particular software component, wherein the type of test action is determined based on a determination that the particular software component is an unmanaged software component; and
    generating, using a data processing apparatus, a particular test action of the type, wherein the particular test action is executable, to attempt to verify the particular value from the particular software component at a point in the path nearest the particular software component by inputting a prompt to one of the plurality of software components to initiate another instance of the transaction, identifying that another one of the plurality of software components downstream from the particular software component comprises a managed software component instrumented with a particular agent, determining that the particular agent is an agent downstream from and nearest in the path to the particular software component, and accessing agent data of the particular agent describing a transaction fragment of the other instance of the transaction to verify the particular value.

2. The method of claim 1, wherein the particular test action is one of a plurality of test actions comprising a test of the software components.

3. The method of claim 1, wherein the particular test action verifies the particular value against an expected value for the particular value, and the expected value is dependent on a request value of the transaction.

4. The method of claim 1, wherein the particular software component comprises a third party software component.

5. The method of claim 1, wherein the particular value is independent of at least one input value of the transaction.

6. The method of claim 5, wherein the transaction is to output an additional value dependent on at least one of the input values.

7. The method of claim 6, wherein the test comprises another test action to check the additional value against the input values.

8. The method of claim 1, further comprising determining the path, wherein determining the path comprises identifying relationships between the plurality of transaction fragments.

9. The method of claim 8, wherein the at least a portion of the plurality of software components are monitored by agents and the relationships are identified based at least in part on data collected by the agents from the monitoring.

10. The method of claim 9, wherein the data collected by the agents describes a plurality of instances of the transaction fragments.

11. The method of claim 1, further causing the test to be executed.

12. The method of claim 1, wherein determining the particular software component as the source comprises identifying the particular software component as a leaf node in the path.

13. A computer program product comprising a non-transitory computer readable storage medium comprising computer readable program code embodied therewith, the computer readable program code comprising:
    computer readable program code configured to identify data representing a path of a transaction, wherein the path comprises a plurality of transaction fragments associated with a plurality of software components, the transaction is to return a particular value, and the particular value is returned by a first one of the plurality of software components;
    computer readable program code configured to determine, from the data, that a particular one of the plurality of software components is a source of the particular value, wherein the particular software component is different from the first software component and passes the particular value in a particular one of the plurality of transaction fragments;
    computer readable program code configured to determine a type of test action for use in verifying the particular value as originally generated at the particular software component, wherein the type of test action is determined based on a determination that the particular software component is an unmanaged software component; and
    computer readable program code configured to generate the particular test action of the type, wherein the particular test action is executable to attempt to verify the particular value from the particular software component at a point in the path nearest the particular software component by inputting a prompt to one of the plurality of software components to initiate another instance of the transaction, identifying that another one of the plurality of software components downstream from the particular software component comprises a managed software component instrumented with a particular agent, determining that the particular agent is an agent downstream from and nearest in the path to the particular software component, and accessing agent data of the particular agent describing a transaction fragment of the other instance of the transaction to verify the particular value.

14. A system comprising:
    a processor device;

a memory element; and a test generation engine comprising executable instructions executable by the processor device to:

identify data representing a path of a transaction, wherein the path comprises a plurality of transaction fragments associated with a plurality of software components, the transaction is to return a particular value, and the particular value is returned by a first one of the plurality of software components;

determine, from the data, that a particular one of the plurality of software components is a source of the particular value, wherein the particular software component is different from the first software component and passes the particular value in a particular one of the plurality of transaction fragments;

determine a type of test action for use in verifying the particular value as originally generated at the particular software component, wherein the type of test action is determined based on a determination that the particular software component is an unmanaged software component; and generate the particular test action of the type, wherein the particular test action is executable to attempt to verify the particular value from the particular software component at a point in the path nearest the particular software component by inputting a prompt to one of the plurality of software components to initiate another instance of the transaction, identifying that another one of the plurality of software components downstream from the particular software component comprises a managed software component instrumented with a particular agent, determining that the particular agent is an agent downstream from and nearest in the path to the particular software component, and accessing agent data of the particular agent describing a transaction fragment of the other instance of the transaction to verify the particular value.

15. The system of claim 14, further comprising a test engine comprising executable instructions executable by the processor device to execute the particular test action in a test of the transaction in response to determining that the particular software component is the source of the particular value.

16. The system of claim 14, further comprising the particular agent comprising executable instructions executable by the processor device to monitor data passed from and to the particular software component.

17. The system of claim 14, further comprising a path engine comprising executable instructions executable by the processor device to determine the path and generate the data representing the path.

* * * * *